(12) United States Patent
Chu et al.

(10) Patent No.: US 8,296,504 B2
(45) Date of Patent: Oct. 23, 2012

(54) DATA MANAGEMENT METHOD AND FLASH MEMORY STORAGE SYSTEM AND CONTROLLER USING THE SAME

(75) Inventors: Chien-Hua Chu, Hsinchu County (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 720 days.

(21) Appl. No.: 12/480,125

(22) Filed: Jun. 8, 2009

(65) Prior Publication Data
US 2010/0257307 A1 Oct. 7, 2010

(30) Foreign Application Priority Data
Apr. 1, 2009 (TW) .............................. 98110901 A

(51) Int. Cl.
*G06F 12/00* (2006.01)
*G06F 12/08* (2006.01)
*G06F 12/02* (2006.01)

(52) U.S. Cl. . 711/103; 711/118; 711/170; 711/E12.001; 711/E12.008; 711/E12.017

(58) Field of Classification Search .................. 711/103, 711/118, 170, E12.001, E12.008, E12.017
See application file for complete search history.

(56) References Cited

U.S. PATENT DOCUMENTS
2003/0193856 A1* 10/2003 Suzuki ........................ 369/47.3
* cited by examiner

*Primary Examiner* — Yong Choe
(74) *Attorney, Agent, or Firm* — J.C. Patents

(57) ABSTRACT

A data management method for a flash memory storage system having a cache memory is provided. The data management method includes writing data into a flash memory when a write command is executed, and determining currently a state of all the writing data which is temporarily stored in the cache memory. Wherein, if the state indicates that a time for writing all the writing data temporarily stored in the cache memory into a flash memory may exceed an upper limit processing time, a portion of the writing data temporarily stored in the cache memory is first written into the flash memory. Accordingly, the data management method may effectively avoid a delay caused by a flush command issued from the host for flushing the cache memory.

27 Claims, 11 Drawing Sheets

DATA MANAGEMENT METHOD AND FLASH MEMORY STORAGE SYSTEM AND CONTROLLER USING THE SAME

CROSS-REFERENCE TO RELATED APPLICATION

This application claims the priority benefit of Taiwan application serial no. 98110901, filed on Apr. 1, 2009. The entirety of the above-mentioned patent application is hereby incorporated by reference herein and made a part of specification.

BACKGROUND

1. Technology Field

The present invention is related to a data management method for a flash memory storage system, and more particularly, to a data management method for a flash memory storage system having a cache memory, and a flash memory storage system and a flash memory controller using the same, which may effectively shorten a time required for flushing temporary data in the cache memory.

2. Description of Related Art

The growth of digital cameras, mobile phones, and MP3 players has been rapid in recent years. Consequently, demands of consumers for storage media of digital contents have increased tremendously. Flash memory is one of the most adaptable storage media to be carried around and used for storing digital files due to its characteristics such as data non-volatility, low power consumption, small volume, and non-mechanical structure. A Solid State Drive (SSD) is an example of utilizing the flash memory as the storage media, and has been widely applied in the host system as a main disk.

Generally speaking, in designs of a flash memory storage system, physical blocks of the flash memory storage system are grouped into a plurality of physical units and the physical units are further grouped into a data area and a spare area. The physical units in the data area are used for storing valid data written by a writing command, and the physical units in the spare area are used for replacing the physical units in the data area during the execution of the writing command. More specifically, when receiving the writing command from a host to write data into the physical units to be updated in the data area, the flash memory storage system first selects one physical unit from the spare area, copies valid old data of the physical unit to be updated in the data area, and writes the copied valid old data together with the new data to be written into the physical unit selected from the spare area. Then, the flash memory storage system links the physical unit containing the new data to the data area, and erases the physical unit to be updated and links it to the spare area. To enable the host to properly access the physical units that store data in an alternate manner, the flash memory storage system provides logical units to the host. That is, the flash memory storage system records and updates a relationship between the logic units and the physical units of the data area in the logical address-physical address mapping table to reflect the alternation of the physical units. Therefore, the host is only required to perform writing based on the logical units provided and the flash memory storage system reads data from or writes data into the physical units according to the logical address-physical address mapping table.

However, compared with operations of the host system (e.g., data transmission), time required by writing data for a flash memory storage device to perform the above-described the alternation of the physical units is relatively longer, therefore, in order to enhance performance of the flash memory storage device, a cache memory is generally allocated in the flash memory storage device for shortening time required for completing related commands.

For example, in a case where the flash memory storage device takes relatively more time to complete the writing commands from the host system, when the host system issues the write command, the flash memory storage system may temporarily stores the data, which is to be written, into the cache memory, and replies the host system that the writing command is completed. Afterwards, when the cache memory is fully stored with the data, the flash memory storage device then writes the data into the flash memory.

However, in a framework of adding the cache memory for accessing the flash memory storage device, in a case where a great quantity of data is temporarily stored in the cache memory, or the data temporarily stored in the cache memory will be written into a plurality of different logical units, when the host system issues a command for flushing the cache memory, the flash memory storage device takes a very long time for writing the data temporarily stored in the cache memory into the physical units, thereby causing a severe delay on operations of the host system.

SUMMARY

The present invention provides a data management method for a flash memory storage system utilizing a cache memory, and the data management method may effectively avoid a delay produced when the host issues a command of flushing the cache memory.

The present invention provides a flash memory controller for controlling a flash memory storage system, and the flash memory controller may effectively avoid a delay produced when the host issues a command of flushing the cache memory.

The present invention provides a flash memory storage system having a cache memory, and the flash memory storage system may effectively avoid a delay produced when the host issues a command of flushing the cache memory.

An exemplary embodiment of the present invention provides a data management method for a flash memory storage system, wherein the flash memory storage system includes a cache memory and a flash memory, and the flash memory includes a plurality of physical blocks. The data management method includes temporarily storing a plurality of writing data from a host in the cache memory; determining whether a time for writing the writing data into the flash memory is more than an upper limit processing time; and writing at least a portion of the writing data temporarily stored in the cache memory into the flash memory when the time for writing the writing data into the flash memory is more than the upper limit processing time.

An exemplary embodiment of the present invention provides a flash memory controller for controlling a flash memory storage system, wherein the flash memory storage system includes a cache memory and a flash memory, and the flash memory includes a plurality of physical blocks. The flash memory controller includes a microprocessor unit, a host interface unit, a flash memory interface unit, and a memory management unit. The host interface unit, the flash memory interface unit, and the memory management unit are respectively coupled to the microprocessor unit. The memory management unit temporarily stores a plurality of writing data from a host in the cache memory. Further, the memory management unit determines whether a time for writing the writing data into the flash memory is more than the upper limit processing time, and the memory management unit writes at least a portion of the writing data temporarily stored in the cache memory into the flash memory when the time for writing the writing data into the flash memory is more than the upper limit processing time.

The present invention proposes a flash memory storage system which includes a cache memory, a flash memory having a plurality of physical blocks and a flash memory controller. The flash memory controller is coupled to the cache memory and the flash memory, and the flash memory controller temporarily stores a plurality of writing data from a host in the cache memory. Further, the flash memory controller determines whether a time for writing the writing data into the flash memory is more than the upper limit processing time, and the flash memory controller writes at least a portion of the writing data temporarily stored in the cache memory into the flash memory when the time for writing the writing data into the flash memory is more than the upper limit processing time.

In summary, the present invention may effectively manage data in the cache memory, and thus avoid the delay produced when the host issues a flush command.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The data management method proposed by the present invention is to detect a state of writing data stored in a cache memory periodically or aperiodically, or before a host writes the writing data into a cache memory, or after the host writes the writing data into the cache memory, and determine whether time required for writing all the temporarily stored writing data into physical units of the flash memory storage system exceeds a upper limit processing time. In addition, when the time required for writing all the temporarily stored writing data exceeds the upper limit processing time, a portion of the writing data temporarily stored in the cache memory is first written into the physical units.

Here, the upper limit processing time is an expectation value determined by a user, and indicates a time which may be tolerated by the user for the system staying in a busy state and unable responding to other commands. In following exemplary embodiments, the upper limit processing time is set as 800 milliseconds. Therefore, according to the data management method, a problem of delay produced when the host system issues the commands for flushing a great quantity of data or non-continuous data stored in the cache memory is resolved in the flash memory storage system having the cache memory. Several exemplary embodiments of the present invention will be described in details in the following with reference to accompany the drawings.

First Exemplary Embodiment

Figure 1:
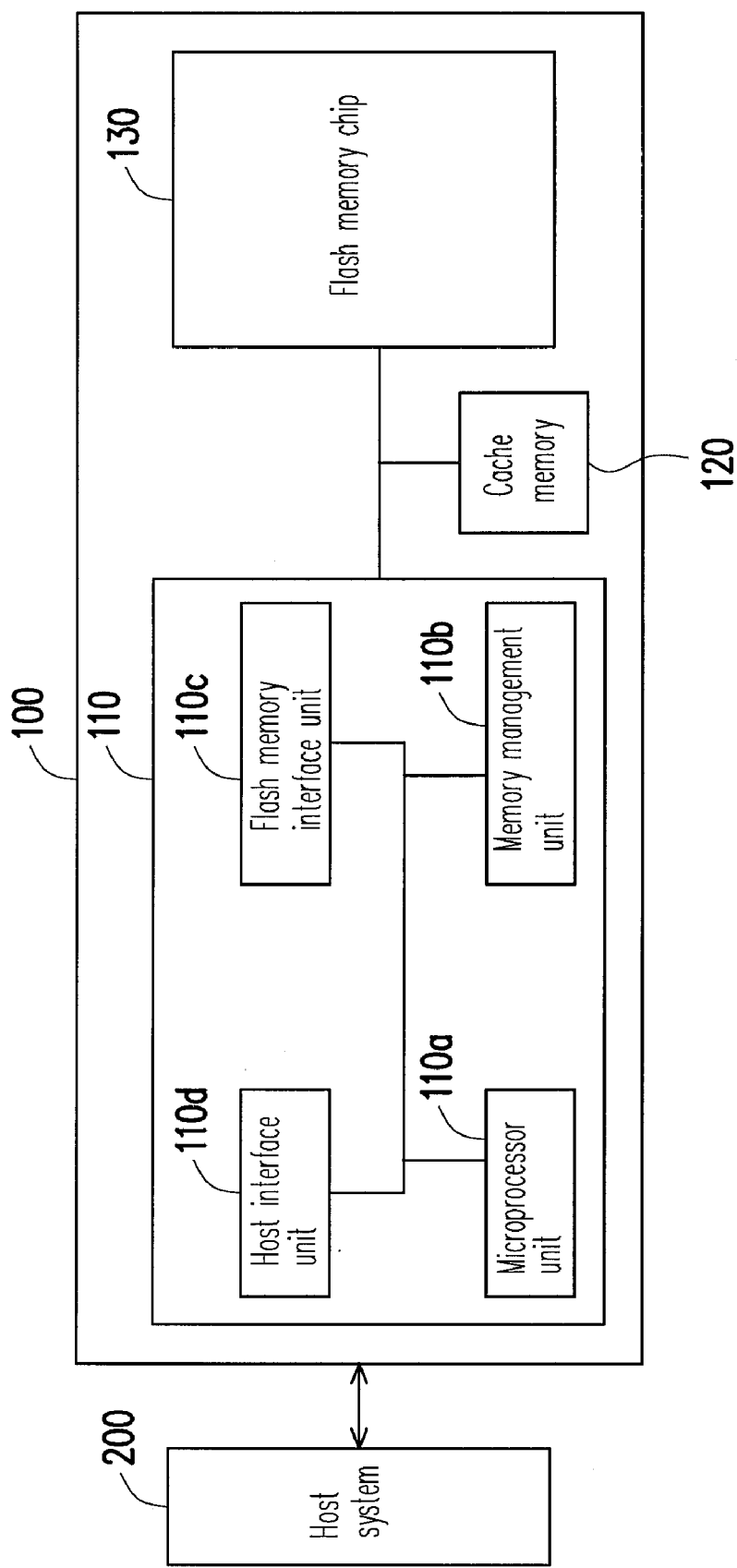
FIG. 1 is a schematic block diagram illustrating a flash memory storage system according to an exemplary embodiment of the present invention.

FIG. 1 is a schematic block diagram illustrating a flash memory storage system according to an exemplary embodiment of the present invention.

Referring to FIG. 1, a flash memory storage system 100 is usually used together with a host 200 so that the host 200 can write data into the flash memory storage system 100 or read data from the flash memory storage system 100. In the present exemplary embodiment, the flash memory storage system 100 is a solid state drive (SSD). However, it should be understood that, in another embodiment of the present invention, the flash memory storage system 100 may also be a memory card or a flash drive.

The flash memory storage system 100 includes a flash memory controller 110, a cache memory 120, and a flash memory chip 130.

The flash memory controller 110 executes a plurality of logic gates or control commands which are implemented in a hardware form or in a firmware form, so as to perform operations of writing, reading or erasing data in the flash memory chip 130 according to the commands of the host 200. The flash memory controller 110 includes a microprocessor unit 110a, a memory management unit 110b, a flash memory interface unit 110c, and a host interface unit 110d.

The microprocessor unit 110a is configured to control whole operations of the flash memory controller 110. More specifically, the microprocessor unit 110a is coordinated with the memory management unit 110b, the flash memory interface unit 110c, the host interface unit 110d, and so on to altogether perform the operations of writing, reading or erasing data of the flash memory storage system 100.

The memory management unit 110b is coupled to the microprocessor unit 110a and is configured to perform block management mechanism, data writing mechanisms according to the present exemplary embodiment.

In the present exemplary embodiment, the memory management unit 110b is implemented in the flash memory controller 110 in a firmware form. For example, a plurality of the control commands is burn into a program memory (e.g., a read only memory (ROM)) and the program memory is further embedded in the flash memory controller 110 for implementing the memory management unit 110b, wherein when the flash memory storage system 100 is activated, a plurality of machine commands of the memory management unit 110b are executed by the microprocessor unit 110a to perform the block management mechanism and the data writing mechanisms according to the present exemplary embodiment.

In another exemplary embodiment of the present invention, the control commands of the memory management unit 110b may also be stored in a specific area (for example, a system area, which is just used for storing system data, in the flash memory) of the flash memory chip 130 in a software form. Similarly, when the flash memory storage system 100 is activated, the control commands of the memory management unit 110b are executed by the microprocessor unit 110a. Moreover, in another exemplary embodiment of the present invention, the memory management unit 100b may also be implemented in the flash memory controller 110 in a hardware form.

The flash memory interface unit 110c is coupled to the microprocessor unit 110a for accessing the flash memory chip 130. That is, the data to be written into the flash memory chip 130 is transformed to a format acceptable to the flash memory chip 130 by the flash memory interface unit 110c.

The host interface unit 110d is coupled to the microprocessor unit 110a for receiving and identifying the commands from the host 200. In other words, the commands and data from the host 200 are transmitted to the microprocessor unit 110a via the host interface unit 110d. In the present exemplary embodiment, the host interface unit 110d is a Serial Advanced Technology Attachment (SATA) interface. However, it is to be understood that the present invention is not limited thereto, and the host interface unit 110d may also be a Universal Serial Bus (USB) interface, an Institute of Electrical and Electronics Engineers (IEEE) 1394 interface, a Peripheral Component Interconnect (PCI) Express interface, an Memory Stick (MS) interface, an Multi Media Card (MMC) interface, an Secure Digital (SD) interface, a Compact Flash (CF) interface, an Integrated Drive Electronics (IDE) interface, or other suitable types of interfaces for data transmission.

Moreover, though not shown in the present exemplary embodiment, the flash memory controller 110 also includes other general function modules for controlling the flash memory, such as a buffer, an error correction unit, and a power management unit.

The cache memory 120 is coupled to the flash memory controller 110 and is configured to temporarily store data accessed by the host 200. In the present exemplary embodiment, the cache memory 120 is a dynamic random access memory (DRAM). However, it is to be understood that the present invention is not limited thereto, magnetoresistive random access memory (MRAM), phase change random access memory (PRAM), single level cell (SLC) NAND flash memory or other suitable types of memory may also be applied to the present invention. In particular, the cache memory 120 may also be implemented by a portion of storage space of the flash memory chip 130 or implemented by allocating a memory in the flash memory controller 110.

The flash memory chip 130 is coupled with the flash memory controller 110 for storing data. In the present exemplary embodiment, the flash memory chip 130 is a multi-level cell (MLC) NAND flash memory. Nevertheless, it should be understood that the present invention is not limited thereto. In another exemplary embodiment, a SLC NAND flash memory may also be applied to the present invention.

Figure 2:
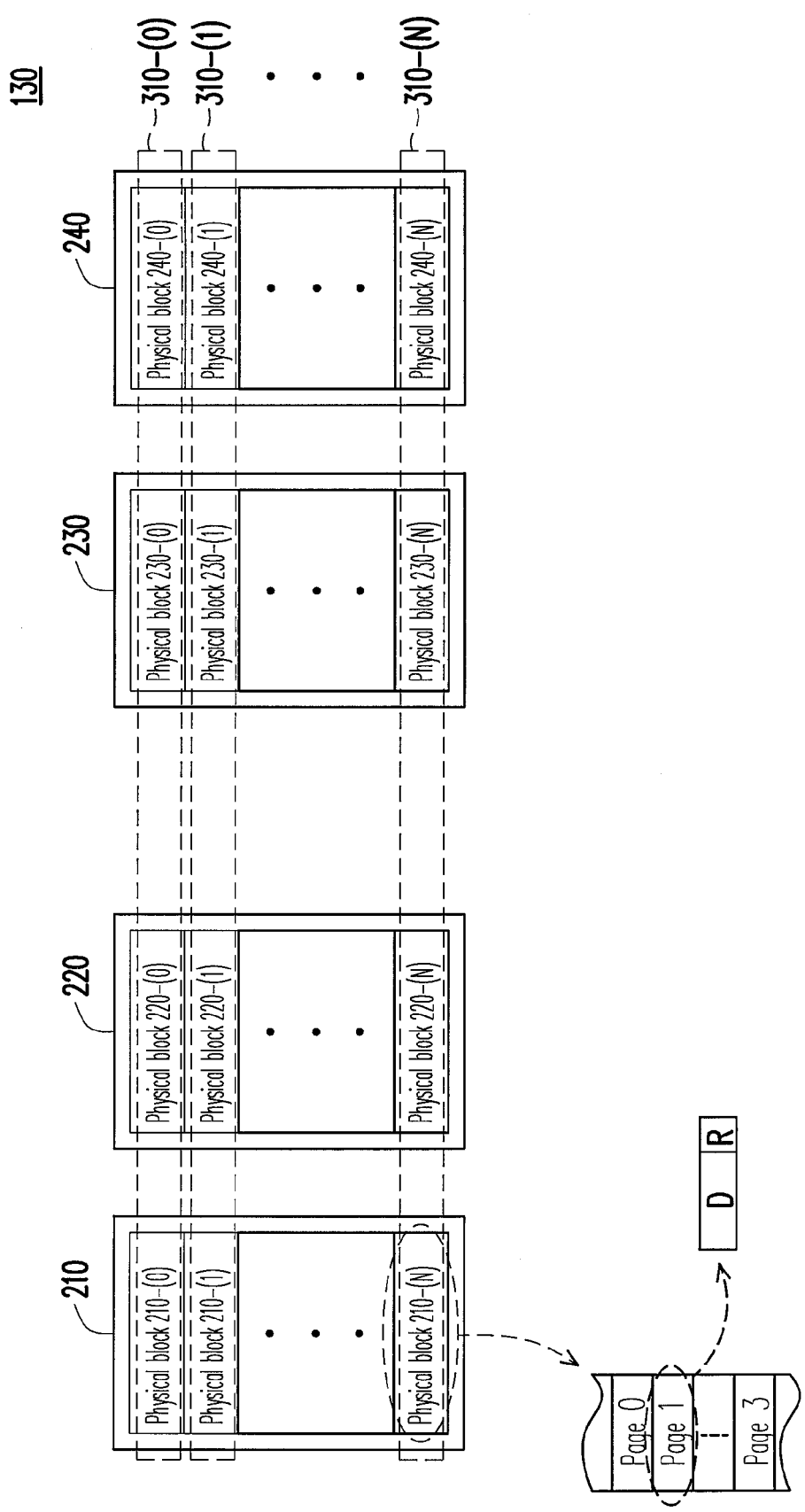
FIG. 2 is a schematic block diagram illustrating a flash memory chip according to an exemplary embodiment of the present invention.

FIG. 2 illustrates a schematic block diagram of the flash memory chip 130 in FIG. 1.

In the present exemplary embodiment, the flash memory chip 130 includes a first flash memory module 210, a second flash memory module 220, a third flash memory module 230, and a fourth flash memory module 240, wherein the first flash memory module 210 includes physical blocks 210-(0)~210-(N); the second flash memory module 220 includes physical blocks 220-(0)~220-(N); the third flash memory module 230 includes physical blocks 230-(0)~230-(N); and the fourth flash memory module 240 includes physical blocks 240-(0)~240-(N). It is to be noted that the description of this embodiment is based on the example that the flash memory chip 130 includes four flash memory modules, but the present invention is not limited thereto.

In the flash memory chip 130, a smallest unit for erasing data is one physical block. That is to say, each of the physical blocks has a minimum number of memory cells for being erased altogether. Each of the physical blocks is usually divided into a plurality of pages. Since in the present exemplary embodiment, the flash memory chip 130 is a MLC NAND flash memory, thus a smallest unit for programs is one page. In other words, one page is the smallest unit for writing data or reading data. Each of the pages usually includes a user data area D and a redundancy area R. The user data area D is configured for storing user data, and the redundancy area R is configured for storing system data (for example, an error checking and correcting code (ECC code)). In the present exemplary embodiment, each of the pages of the flash memory chip 130 has 8 sectors, and generally, one sector is 512 bytes so one page is 4 kilo bytes (KB).

However, it is to be noted that, in other flash memory designs (e.g., SLC NAND flash memory), a smallest unit to program may also be a sector, in other words, making a sector as a smallest unit to program. In addition, the physical blocks of the first flash memory module 210, the second flash memory module 220, the third flash memory module 230, and the fourth flash memory module 240 are usually grouped into a plurality of zones. By managing the physical blocks 210-(0)~210-(N), the physical blocks 220-(0)~220-(N), the physical blocks 230-(0)~230-(N), and the physical blocks 240-(0)~240-(N) in unit of zones, the parallelism of operations is increased and the management of these physical blocks is simplified.

In the present exemplary embodiment, the flash memory controller 110 logically groups the physical blocks of the first flash memory module 210, the second flash memory module 220, the third flash memory module 230, and the fourth flash memory module 240 into a plurality of physical units for management, and one physical unit includes 4 physical blocks, for example. By managing the flash memory chip 130 in unit of physical units, the flash memory controller 110 maintains a logical address-physical address mapping table in a larger unit (i.e., one physical unit). Accordingly, a required space in a buffer is reduced. In the present exemplary embodiment of the present invention, the physical blocks 210-(0)~210-(N), the physical blocks 220-(0)~220-(N), the physical blocks 230-(0)~230-(N), and the physical blocks 240-(0)~240-(N) are logically grouped into physical units 310-(0)~310-(N). It should to be understood that, in the present exemplary embodiment, loading of system resources is effectively reduced by grouping the physical blocks into the physical units to manage. However, the present invention is not limited thereto, in another exemplary embodiment of the present invention, the data management and the writing mechanism may also be directly performed on the physical blocks according to the present exemplary embodiment.

Figure 3A:
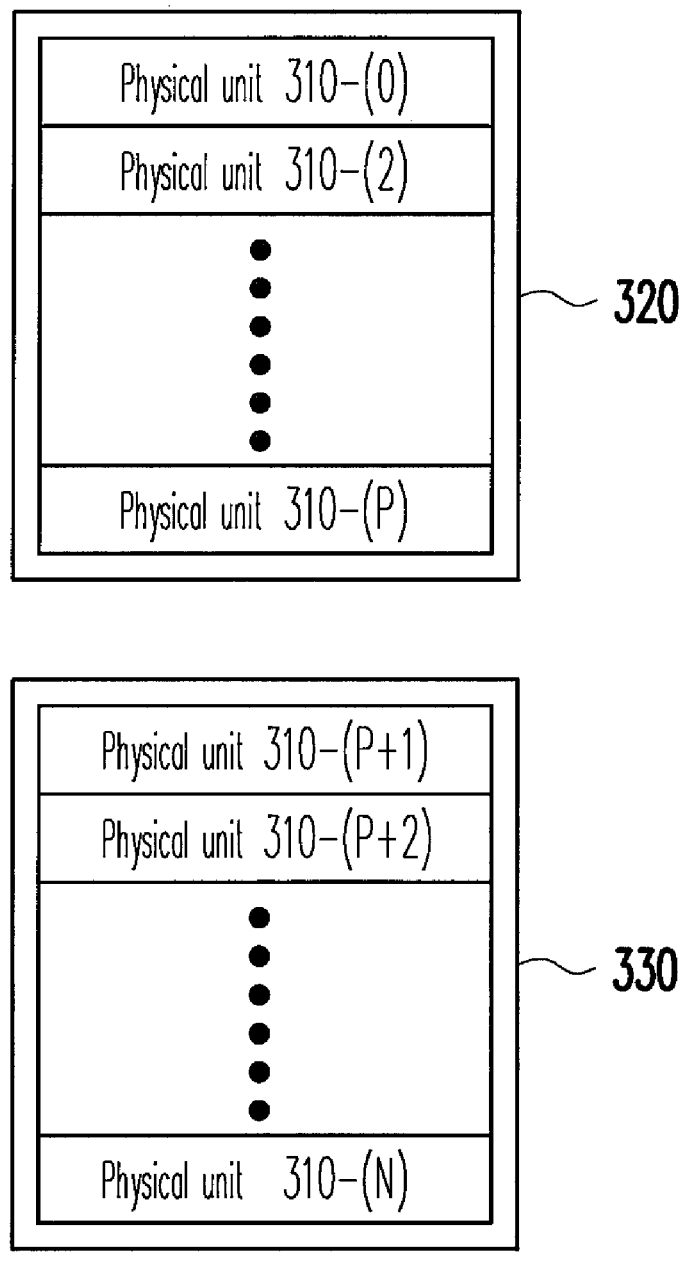
FIGS. 3A~3C are schematic diagrams illustrating operations of a flash memory chip according to an exemplary embodiment of the present invention.
Figure 3B:
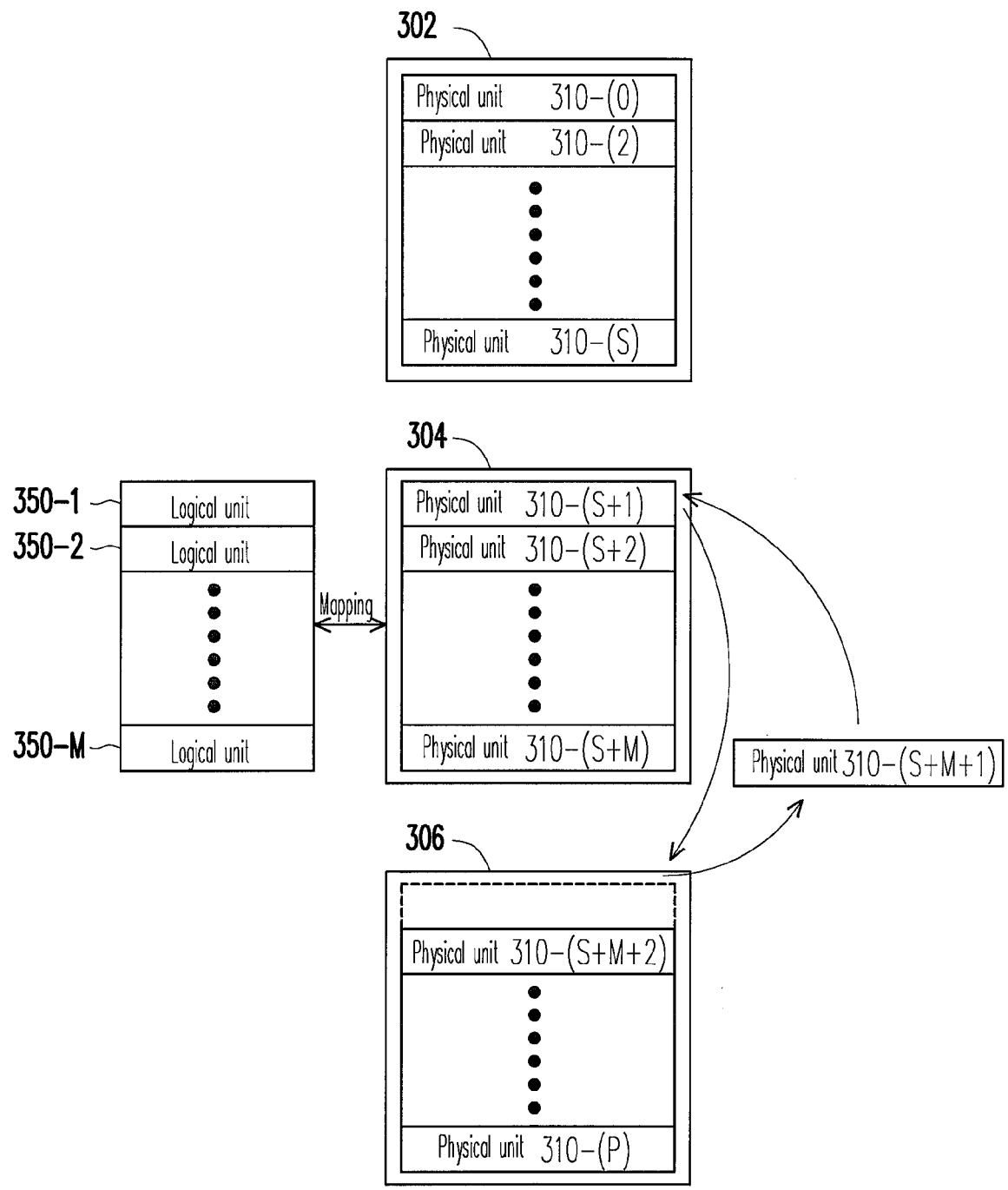
Figure 3C:
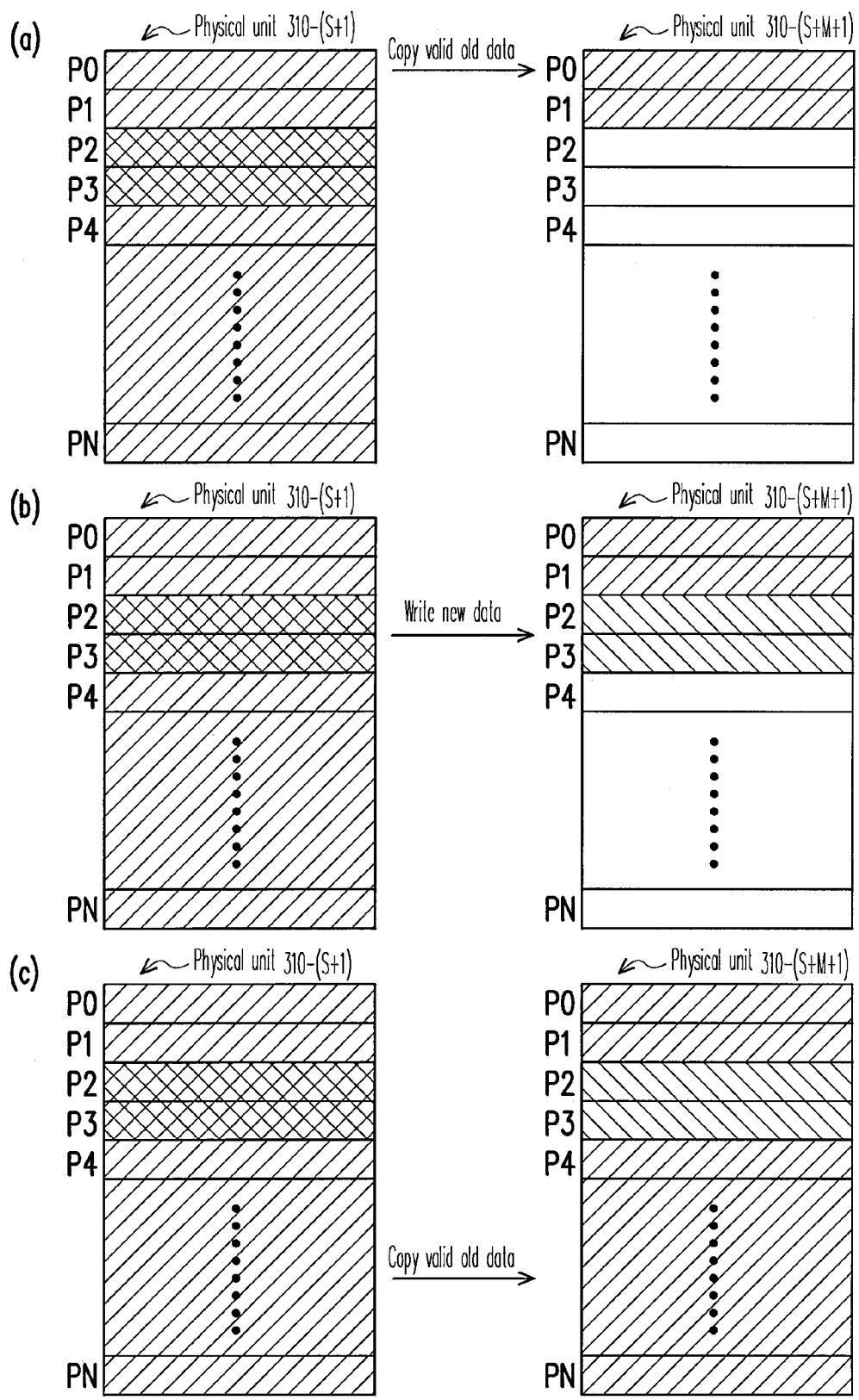

FIGS. 3A~3C are schematic diagrams illustrating operations of the flash memory chip 130 according to an exemplary embodiment of the present invention.

It should be understood that terms, such as "select", "move", "exchange", "replace", "alternate", "group", and so forth, are logical concepts which describe the operations on the physical blocks of the flash memory chip 130. That is, the physical blocks of the flash memory are logically operated, but actual positions of the physical blocks are not changed. It should be mentioned that the following operation is accomplished by the memory management unit 110b of the flash memory controller 110.

Referring to FIG. 3A, the memory management unit 110b logically groups the physical blocks of the flash memory chip 130 into physical units 310-(0)~310-(N), and logically groups the physical units 310-(0)~310-(N) into a storage area 320 and a replacement area 330.

The physical units 310-(0)~310-(P) in the storage area 320 are physical units normally used in the flash memory storage system 100. That is, the memory management unit 110b writes data into the physical units belonging to the storage area 320.

The physical units 310-(P+1)~310-(N) in the replacement area 330 are replaced physical units. For example, when the flash memory chip 130 is manufactured in the factory, 4% of the physical blocks thereof are reserved for replacement (i.e., the replaced physical units). That is, when any of the physical blocks in the storage area 320 is damaged, the physical blocks reserved in the replacement area 330 are used to replace the damaged physical blocks (i.e. bad blocks). Hence, if the replacement area 330 still has available physical blocks therein, the memory management unit 110b selects the available physical blocks from the replacement area 330 to replace the damaged physical blocks when a situation of the damaged physical blocks occurs. If the replacement area 330 no longer has any of the usable physical blocks, the flash memory storage system 100 is announced to be invalid when the situation of the damaged physical blocks occurs.

Referring to FIG. 3B, the memory management unit 110b logically groups the physical blocks of the storage area 320 into a system area 302, a data area 304, and a spare area 306.

The system area 302 includes physical units 310-(0)~310-(S), the data area 304 includes physical units 310-(S+1)~310-(S+M), and the spare area 306 includes physical units 310-(S+M+1)~310-(P). In the present exemplary embodiment, the aforementioned S, M, and P are positive integers which represent a number of the physical blocks allocated in each area, and may be varied based on a capacity of the flash memory module used by the manufacturer of the flash memory storage system.

The physical units logically belonging to the system area 302 are used for recording the system data, which includes information related to the manufacturer and a model of the flash memory chip, the number of the zones in each flash memory module, the number of the physical blocks in each zone, the number of the pages in each physical block, and so forth.

The physical units logically belonging to the data area 304 are used to store user data, and these physical units are mapped to the logical units accessed by the host 200. That is, the physical units in the data area 304 are units which store valid data.

The physical units logically belonging to the spare area 306 are used to substitute the physical units in the data area 304. Therefore, when the physical units of the spare area 306 are blank or available units, it means that these physical units have no data recorded thereon or having data marked as invalid. In other words, the physical units in the data area 304 and the spare area 306 are used alternatively to store data to be written by the host 200 into the flash memory storage system 100.

As mentioned previously, the physical units of the flash memory chip 130 are alternated to store data from the host 200. Therefore, the memory management unit 110b provides logic units 350-1~350-M for the host 200 to access the data and maintains the logical address-physical address mapping table to record the physical units mapped to the logic units.

For example, referring to FIG. 3B and FIG. 3C, when the host 200 writes data into the logic unit 350-1, the memory management unit 110b refers to the logical address-physical address mapping table for determining that the logic unit 350-1 is currently mapping to a physical unit 310-(S+1) which logically belongs to the data area 304. Thus, the memory management unit 110b updates the data in the physical unit 310-(S+1), and meanwhile, the flash memory controller 110 selects the physical unit 310-(S+M+1) from the spare area 306 to substitute the physical unit 310-(S+1) in the data area 304. However, the memory management unit 110b does not instantly move all the valid data in the physical unit 310-(S+1) to the physical unit 310-(S+M+1) and erase the physical unit 310-(S+1) when the memory management unit 110b writes new data into the physical unit 310-(S+M+1). More specifically, the memory management unit 110b copies the valid data in the physical unit 310-(S+1) before the page to be written (i.e., the pages P0 and P1) into the physical unit 310-(S+M+1) (as shown in FIG. 3C(a)) and then writes the new data (i.e., Pages P2 and P3 in the physical unit 310-(S+M+1)) into the physical unit 310-(S+M+1) (as shown in FIG. 3C(b)). Thereby, at this time, the memory management unit 110b completes the operation of writing. Since the valid data in the physical unit 310-(S+1) may become invalid in a next operation (for example, a writing command), instantly moving all the valid data from the physical unit 310-(S+1) to the physical unit 310-(S+M+1) may be unnecessary. In this case, the combination contents of the physical unit 310-(S+1) and the physical unit 310-(S+M+1) is the complete content of the corresponding logic unit 350-1. The number of such transient mother-child relationships (i.e., the physical units 310-(S+1) and 310-(S+M+1)) is determined according to the capacity of a buffer in the flash memory controller 110, and the operation for temporarily maintaining such a transient relationship is referred to as "opening" mother-child units. In particular, in a situation of opening the mother-child units, the processed logical unit is mapped to a plurality of physical units.

Thereafter, only when the contents in the physical units 310-(S+1) and 310-(S+M+1) are to be really combined, the memory management unit 110b integrates the physical unit 310-(S+1) and the physical unit 310-(S+M+1) into a single physical unit, so that the efficiency in using these units can be improved. Such an integration action is also referred to as "closing" the mother-child units. For example, as shown in FIG. 3C(c), when the mother-child units are closed, the memory management unit 110b copies the remaining valid data in the physical unit 310-(S+1) (i.e., pages P4~PN) to the substitute physical unit 310-(S+M+1), and then erases the physical unit 310-(S+1) and links it to the spare area 306. Meanwhile, the memory management unit 110b links the physical unit 310-(S+M+1) to the data area 304 and updates the logical address-physical address mapping table to indicate that the logical unit 350-1 is now mapped to the physical unit 310-(S+M+1) Thereby, the operation of closing the mother-child units is completed. In particular, in a situation of closing the mother-child units, the processed logical unit is mapped to one physical unit.

In the flash memory storage system 100 according to the present exemplary embodiment, when the host 200 is about to write data into the flash memory storage system 100, the memory management unit 110b of the flash memory controller 110 receives a write command and writing data, wherein the write command may include a logical address into which the writing data is stored. Thereafter, the memory management unit 110b of the flash memory controller 110 transforms the logical address into a corresponding logical unit, temporarily stores the writing data in the cache memory 120, and records the logical unit in which the writing data is stored. Meanwhile, the flash memory storage system 100 may repeatedly receive the writing data to be written by the host 200 and process the writing data according to the aforementioned way (i.e., temporarily storing the writing data into the cache memory 120). Then, when the host 200 issues a flush command or at an appropriate timing, the memory management unit 110b writes the writing data temporarily stored in the cache memory 120 into the storage area 320 of the flash memory chip 130 (as the operation illustrated in FIG. 3A~FIG. 3C). It is to be noted that, in the present exemplary embodiment, when the host 200 issues the writing command and the writing data to be stored is temporarily stored in the cache memory 120, the memory management unit 110b calculate currently data quantity of the writing data temporarily stored in the cache memory 120, and determine whether currently the data quantity of the writing data temporarily stored in the cache memory 120 is more than a data quantity threshold. Here, the data quantity threshold is determined by the user according to a delay time acceptable to the flash memory storage system 100. In particular, the data quantity threshold is determined according to the upper limit processing time mentioned previously.

For example, in the present exemplary embodiment, when the data quantity of the writing data temporarily stored in the cache memory 120 reaches two thirds of a capacity of the cache memory 120, time required for the flash memory storage system 100 writes the writing data into the flash memory chip 130 is more than the above-described upper limit processing time. Therefore, the data quantity threshold is set as two thirds of the capacity of the cache memory 120 in this case.

That is, when the data quantity temporarily stored in the cache memory 120 is more than the data quantity threshold, the time to write the writing data temporarily stored in the cache memory 120 into the flash memory chip 130 is determined to be more than the upper limit processing time when the host 200 performs the flush command. Therefore, under a circumstance of the data quantity temporarily stored in the cache memory 120 being more than the data quantity threshold, the memory management unit 110b writes a portion of the writing data temporarily stored in the cache memory 120 into the storage area 320. More specifically, the memory management unit 110b writes the portion of the writing data into the mapped physical units according to the logical units which is to store the portion of the writing data (as illustrated in FIG. 3A~FIG. 3C). In the exemplary embodiment, the memory management unit 110b writes the writing data which belong to an identical logical unit into the mapped physical units. However, the present invention is not limited thereto, in another exemplary embodiment of the present invention, the memory management unit 110b also writes the writing data which belong to a plurality of the logical units into the mapped physical units.

In another exemplary embodiment of the present invention, when executing the operations of writing the writing data which belong to the same logical unit into the mapped physical units, the memory management unit 110b determines whether a ratio of the data quantity of the writing data belonging to the same logical unit in the cache memory to a capacity of the whole logical unit is more than a ratio threshold, wherein the ratio threshold may be determined by the user. For example, here, in the present exemplary embodiment, the ratio threshold is set as 50%. More specifically, the memory management unit 110b determines how much data belonging to the logical unit is stored in the cache memory 120, wherein if the data quantity of the logical unit exceeds a certain ratio, the memory management unit 110b copies old valid data in the physical units originally mapped to the logical unit into the cache memory 120, and writes the writing data temporarily stored in the cache memory 120 and the copied old valid data into the physical units selected from the spare area 306 after integrating the writing data temporarily stored in the cache memory 120 with the copied old valid data.

Figure 4:
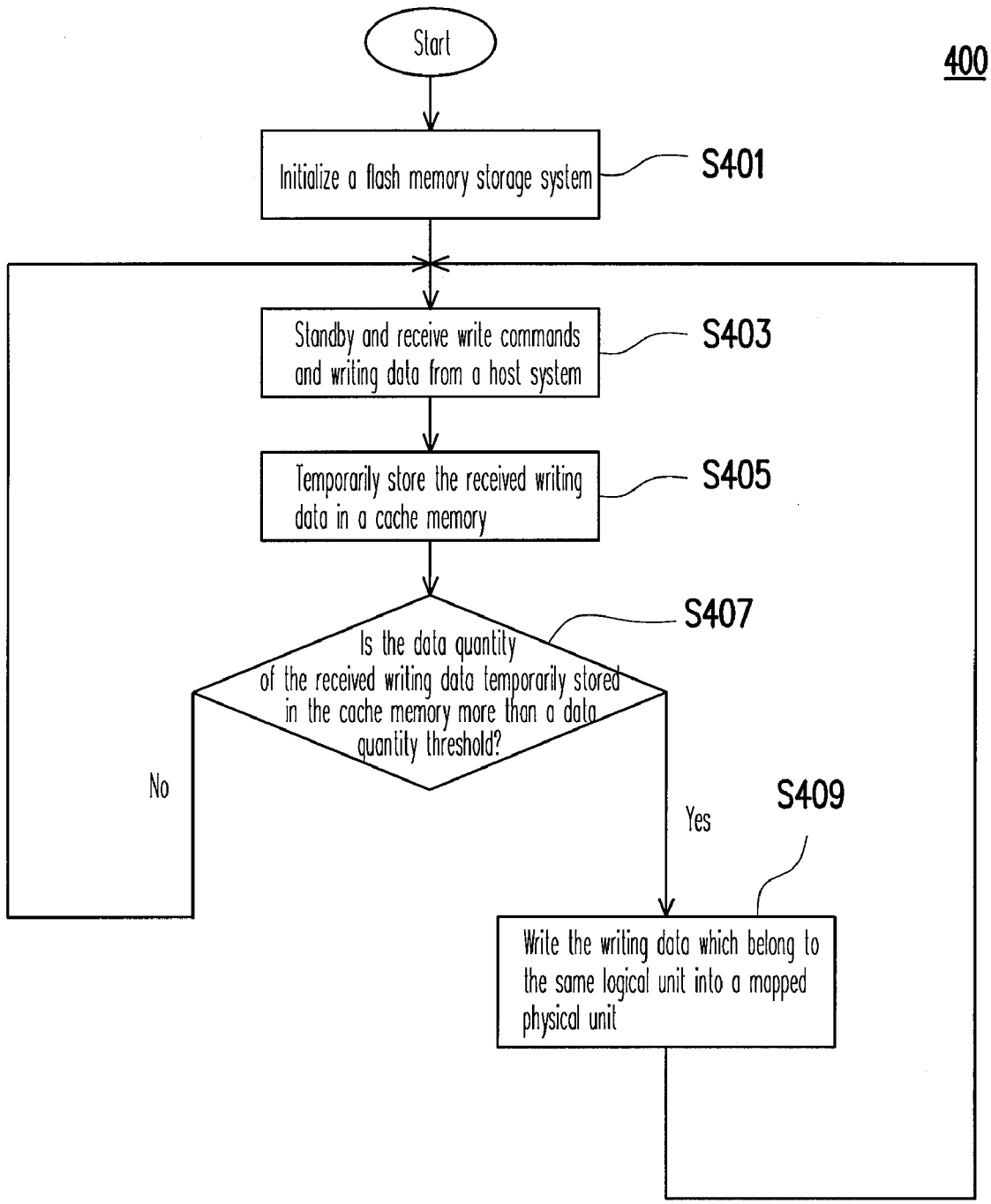
FIG. 4 is a flow chart illustrating a data management process according to a first exemplary embodiment of the present invention.

FIG. 4 is a flow chart illustrating a data management process 400 according to a first exemplary embodiment of the present invention.

Referring to FIG. 4, when the flash memory storage system 100 is activated, in step S401, the flash memory storage system 100 is initialized. More specifically, in the step S401, the memory management unit 110b of the flash memory controller 110 loads related information (information related to structures and operations illustrated in FIG. 2, FIG. 3A, FIG. 3B, and FIG. 3C) for the flash memory chip 130.

In step S403, the flash memory controller 110 is on a standby mode to receive the write command and the writing data from the host 200. Then, in step S405, the flash memory controller 110 temporarily stores the writing data into the cache memory 120. Thereafter, in step S407, the flash memory controller 110 determines whether the data quantity of the writing data temporarily stored in the cache memory 120 is more than the data quantity threshold. If the data quantity of the writing data temporarily stored in the cache memory 120 is more than the data quantity threshold, then, in step S409, the flash memory controller 110 writes the writing data which belong to the same logical unit into the mapped physical units. Then, the data management process 400 returns to the step S403 for a standby.

Second Exemplary Embodiment

Compared to determining whether the time required by writing all the temporarily stored writing data into the physical units is more than the upper limit processing time mentioned previously according to the data quantity temporarily stored in the cache memory in the first exemplary embodiment, the flash memory storage system of the second exemplary embodiment determines whether the time required by writing all the temporarily stored writing data into the physical units is more than the above-described upper limit processing time according to a dispersity of the writing data temporarily stored in the cache memory. Here, hardware structures schematic diagram of the first exemplary embodiment and the second exemplary embodiment are similar, the second exemplary embodiment is further described by FIG. 1, FIG. 2, and FIG. 3A~3C in the following.

Similar to operations of the first exemplary embodiment, in the present exemplary embodiment, when the host 200 is about to write the data into the flash memory storage system 100, the memory management unit 110b receives the write command and the writing data, wherein the write command may include the logical address into which the writing data to be stored. Thereafter, the memory management unit 110b transforms the logical address into the corresponding logical unit, temporarily stores the writing data in the cache memory 120, and records the logical unit in which the writing data is stored. Meanwhile, the flash memory storage system 100 may repeatedly receive the writing data to be written from the host 200 and process the writing data in a fashion similar to the aforementioned way (i.e., temporarily storing the writing data into the cache memory 120). Then, when the host 200 issues a flush command or at an appropriate timing, the memory management unit 110b writes the writing data temporarily stored in the cache memory 120 into the storage area 320 of the flash memory chip 130 (as the operation illustrated in FIG. 3A~FIG. 3C).

Moreover, in the exemplary embodiment, after the host 200 issues the write command and the writing data to be stored is temporarily stored in the cache memory 120, the memory management unit 110b determines whether currently the number of the logical units corresponding to the writing data temporarily stored in the cache memory 120 is more than a data dispersity threshold. More specifically, the memory management unit 110b may know into which logical units the host 200 is about to write the writing data according to the write command issued by the host 200. Thereby, the memory management unit 110b may calculate the number of logical units on which the above-described opening the mother-child units and closing the mother-child units (the operations as illustrated in FIG. 3A~3C) should be performed. Thereby, the memory management unit 110b may further determine whether the flash memory storage system 100 is able to write all the writing data temporarily stored in the cache memory 120 into the storage area 320 of the flash memory chip 130 within the aforementioned upper limit processing time once the host 200 issues the flush command to the flash memory storage system 100. Here, the data dispersity threshold is configured by the user himself/herself according to the delay time acceptable to the flash memory storage system 100. In particular, the data dispersity threshold is set according to the aforementioned upper limit processing time mentioned previously.

For example, in the present exemplary embodiment, when the writing data temporarily stored in the cache memory 120 corresponds 100 of the logical units, then the flash memory storage system 100 writes the writing data which takes more than the aforementioned upper limit processing time into the physical units mapped the one hundred (100) of the logical units. Therefore, the data dispersity threshold is configured to be one hundred (100).

That is, when the number of the logical units corresponding to the writing data temporarily stored in the cache memory 120 is more than the data dispersity threshold, the memory management unit 110b determines that the time for writing all the writing data temporarily stored in the cache memory 120 into the flash memory 130 is more than the aforementioned upper limit processing time when the host 200 issues the flush command. Therefore, under a circumstance of the number of the logical units corresponding to the writing data temporarily stored in the cache memory 120 being more than the data dispersity threshold, the memory management unit 110b writes a portion of the writing data temporarily stored in the cache memory 120 into the storage area 320. More specifically, the memory management unit 110b writes the portion of the writing data into the mapped physical units (as illustrated in FIG. 3A~FIG. 3C) according to the logical units into which the portion of the writing data is stored. In an identical fashion as the above-described first exemplary embodiment, the memory management unit 110b writes the writing data which belong to an identical logical unit in the cache memory 120 into the mapped physical units.

Figure 5:
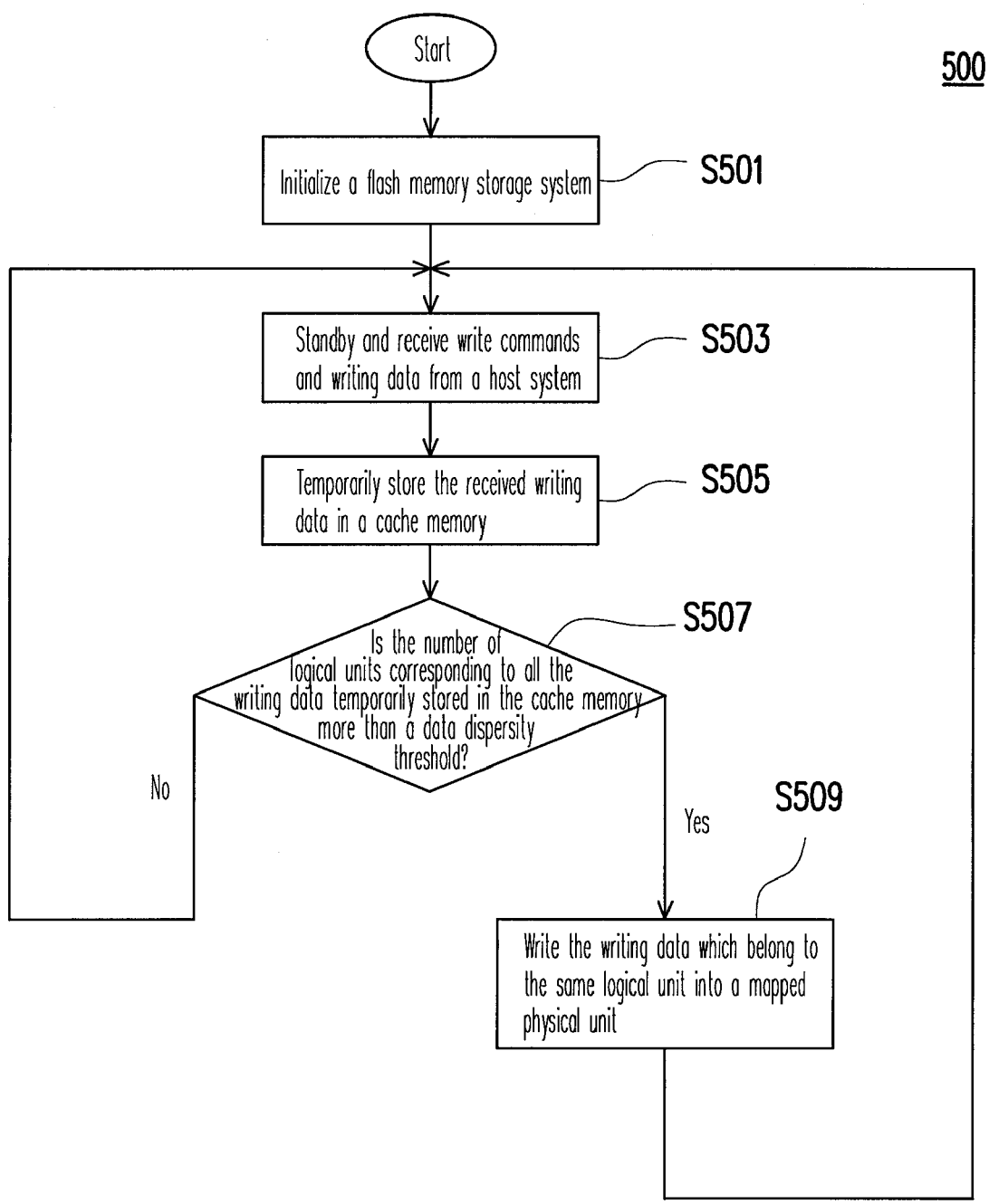
FIG. 5 is a flow chart illustrating a data management process according to a second exemplary embodiment of the present invention.

FIG. 5 is a flow chart illustrating a data management process 500 according to a second exemplary embodiment of the present invention.

Referring to FIG. 5, when the flash memory storage system 100 is activated, in step S501, the flash memory storage system 100 is initialized.

In step S503, the flash memory controller 110 is on a standby mode to receive the write command and the writing data from the host 200. Then, in step S505, the flash memory controller 110 temporarily stores the writing data into the cache memory 120. Besides, in step S507, the flash memory controller 110 determines whether the number of the logical units corresponding to the writing data temporarily stored in the cache memory 120 is more than the data dispersity threshold. If the number of the logical units corresponding to the writing data temporarily stored in the cache memory 120 is more than the data dispersity threshold, then in step S509, the flash memory controller 110 writes the writing data which belong to the same logical unit into the corresponding physical units. Then, the data management process 500 returns to the step S503 for the standby mode.

Third Exemplary Embodiment

A difference of the third exemplary embodiment from the first exemplary embodiment is that the flash memory storage system of the third exemplary embodiment determines whether the time for writing all the temporarily stored writing data into the physical units exceeds the aforementioned upper limit processing time according to a state of the flash memory chip. Here, hardware structures schematic diagram of the first exemplary embodiment and the third exemplary embodiment are similar, the third exemplary embodiment is further described by FIG. 1, FIG. 2, and FIG. 3A~3C in the following.

Similar to operations of the first exemplary embodiment, in the present exemplary embodiment, when the host 200 is about to write the data into the flash memory storage system 100, the memory management unit 110b of the flash memory controller 110 receives the write command and the writing data from the host 200, wherein the write command may include the logical address into which the writing data is stored. Thereafter, the memory management unit 110b transforms the logical address into the corresponding logical unit, temporarily stores the writing data in the cache memory 120, and records the logical unit in which the writing data is stored. Meanwhile, the flash memory storage system 100 may repeatedly receive the writing data to be written from the host 200 and process the writing data in a fashion similar to the aforementioned way (i.e., temporarily storing the writing data into the cache memory 120). Then, when the host 200 issues a flush command or at an appropriate timing, the memory management unit 110b writes the writing data temporarily stored in the cache memory 120 into the storage area 320 of the flash memory chip 130 (as the operation illustrated in FIG. 3A~FIG. 3C).

Moreover, when the host 200 issues the write command and the writing data to be stored is temporarily stored in the cache memory 120, the memory management unit 110b calculates an unit processing number according to the number of the logical units corresponding to the writing data temporarily stored in the cache memory 120 and the number of the physical units in the spare area 306, and compare the calculated unit processing number and an upper limit unit processing number in order to further determine whether the time required for writing the writing data temporarily stored in the cache memory 120 is more than the above-described upper limit processing time processing time.

More specifically, when the memory management unit 110b of the flash memory controller 110 is about to perform the operations of writing on the physical units mapped to one of the logical units, as illustrated in FIG. 3A and FIG. 3B, the memory management unit 110b selects another physical unit from the spare area 306 in order to perform operations of opening the mother-child units, wherein if there is no unavailable physical unit (i.e., all the physical units of the spare area 306 have been used for child-physical units corresponding to other physical units), then the memory management unit 110b has to close other mother-child units (as illustrated in FIG. 3B) so as to make the spare area 306 have available physical units to perform the operations of writing. Since a delay of writing mainly occurs during an execution procedure of closing the mother-child units and time required for opening the mother-child units is very short, thus in the present embodiment, the number of the unit processing number (i.e., a number of times required for executing a procedure of closing the mother-child units) is calculated according to the number of the logical units corresponding to the writing data temporarily stored in the cache memory 120 and the number of the available physical units in the spare area 306, thereby, whether the time required for writing the writing data temporarily stored in the cache memory 120 is more than the above-described upper limit processing time can be determined. Here, the upper limit unit processing number is determined by the user according to the time required for closing the mother-child units and the aforementioned upper limit processing time.

For example, in the present exemplary embodiment, the procedure of closing the mother-child units is required to take 200 milliseconds, and the upper limit processing time is 800 milliseconds, therefore the upper limit unit processing number is set as 4. Operations of the present exemplary embodiment will be described in details in the following by an example of writing data.

Suppose the number of the physical units of the spare area 306 available for opening the mother-child units is 5, and the memory management unit 110b has used 3 of the physical units thereof to execute the procedure of opening the mother-child units in order to write the data into the logical units 0, 1, and 2, if the host issues 9 write commands, wherein the write commands respectively direct writing the data into the logical units 3, 4, 0, 5, 3, 6, 7, 8, and 9, the memory management unit 110b temporarily stores the writing data in the cache memory 120 and determine whether the time required for writing the writing data temporarily stored in the cache memory 120 is more than the above-described upper limit processing time. A way of such a determination is described as the following.

In a situation of executing the first write command, the writing data corresponding to the logical unit 3 is stored in the cache memory 120. At this time, if the host 200 issues the flush command, the writing data corresponding to the logical unit 3 is required to be written by executing one procedure of opening the mother-child units. Since there are 2 available physical units in the spare area 306, in a situation of the unit processing number is 0 and not more than the upper limit unit processing number, the memory management unit 110b determines that the time required for writing the writing data currently stored in the cache memory 120 does not exceed the above-described upper limit processing time.

In a situation of executing the second write command, the writing data corresponding to the logical units 3 and 4 are stored in the cache memory 120. At this time, if the host 200 issues the flush command, the writing data corresponding logical units 3 and 4 are required to be written by executing 2 procedures of opening the mother-child units. Since there are 2 available physical units in the spare area 306, in a situation of the unit processing number is 0 (i.e., 2 minus by 2) and not more than the upper limit unit processing number, the memory management unit 110b determines that the time required for writing the writing data currently stored in the cache memory 120 does not exceed the above-described upper limit processing time.

In a situation of executing the third write command, the writing data corresponding logical units 3, 4, and 0 are stored in the cache memory 120. At this time, if the host 200 issues the flush command, since the procedure of opening the mother-child units corresponding to the logical unit 0 has been executed, the writing data corresponding to the logical units 3, 4, and 0 are required to be written by executing 2 procedures of opening the mother-child units. Since there are 2 available physical units in the spare area 306, in a situation of the unit processing number is 0 (i.e., 2 minus by 2) and not more than the upper limit unit processing number, the memory management unit 110b determines that the time required for writing the writing data currently stored in the cache memory 120 does not exceed the above-described upper limit processing time.

In a situation of executing the fourth write command, the writing data corresponding to the logical units 3, 4, 0, and 5 are stored in the cache memory 120. At this time, if the host 200 issues the flush command, since the procedure of opening the mother-child units corresponding to the logical unit 0 has been executed, the writing data corresponding to the logical units 3, 4, 0, and 5 are required to be written by executing 3 procedures of opening the mother-child units. Since there are 2 available physical units in the spare area 306, in a situation of the unit processing number is 1 (i.e., 3 minus by 2) and not more than the upper limit unit processing number, the memory management unit 110b determines that the time required for writing the writing data currently stored in the cache memory 120 does not exceed the above-described upper limit processing time.

In a situation of executing the fifth write command, the writing data corresponding to the logical units 3, 4, 0, and 5 are stored in the cache memory 120. At this time, if the host 200 issues the flush command, since the procedure of opening the mother-child units corresponding to the logical unit 0 has been executed, the writing data corresponding to the logical units 3, 4, 0, and 5 are required to be written by executing 3 procedures of opening the mother-child units. Since there are 2 available physical units in the spare area 306, in a situation of the unit processing number is 1 (i.e., 3 minus by 2) and not more than the upper limit unit processing number, the memory management unit 110b determines that the time required for writing the writing data currently stored in the cache memory 120 does not exceed the above-described upper limit processing time.

In a situation of executing the sixth write command, the writing data corresponding to the logical units 3, 4, 0, 5, and 6 are stored in the cache memory 120. At this time, if the host 200 issues the flush command, since the procedure of opening the mother-child units corresponding to the logical unit 0 has been executed, the writing data corresponding to the logical units 3, 4, 0, 5, and 6 are required to be written by executing 4 procedures of opening the mother-child units. Since there are 2 available physical units in the spare area 306, in a situation of the unit processing number is 2 (i.e., 4 minus by 2) and not more than the upper limit unit processing number, the memory management unit 110b determines that the time required for writing the writing data currently stored in the cache memory 120 does not exceed the above-described upper limit processing time.

In a situation of executing the seventh write command, the writing data corresponding to the logical units 3, 4, 0, 5, 6, and 7 are stored in the cache memory 120. At this time, if the host 200 issues the flush command, since the procedure of opening the mother-child units corresponding to the logical unit 0 has been executed, the writing data corresponding to the logical units 3, 4, 0, 5, 6, and 7 are required to be written by executing 5 procedures of opening the mother-child units. Since there are 2 available physical units in the spare area 306, in a situation of the unit processing number is 3 (i.e., 5 minus by 2) and not more than the upper limit unit processing number, the memory management unit 110b determines that the time required for writing the writing data currently stored in the cache memory 120 does not exceed the above-described upper limit processing time.

In a situation of executing the eighth write command, the writing data corresponding to the logical units 3, 4, 0, 5, 6, 7, and 8 are stored in the cache memory 120. At this time, if the host 200 issues the flush command, since the procedure of opening the mother-child units corresponding to the logical unit 0 has been executed, the writing data corresponding to the logical units 3, 4, 0, 5, 6, 7, and 8 are required to be written by executing 6 procedures of opening the mother-child units. Since there are 2 available physical units in the spare area 306, in a situation of the unit processing number is 4 (i.e., 6 minus by 2) and not more than the upper limit unit processing number, the memory management unit 110b determines that the time required for writing the writing data currently stored in the cache memory 120 does not exceed the above-described upper limit processing time.

In a situation of executing the ninth write command, the writing data corresponding to logical unit 3, 4, 0, 5, 6, 7, 8, and 9 are stored in the cache memory 120. At this time, if the host 200 issues the flush command, since the procedure of opening the mother-child units corresponding to the logical unit 0 has been executed, the writing data corresponding to the logical unit 3, 4, 0, 5, 6, 7, 8, and 9 are required to be written by executing 7 procedures of opening the mother-child units. Since there are 2 available physical units in the spare area 306, in a situation of the unit processing number is 5 (i.e., 7 minus by 2) and also more than the upper limit unit processing number, the memory management unit 110b determines that the time required for writing the writing data currently stored in the cache memory 120 exceeds the above-described upper limit processing time.

In the present exemplary embodiment, in a situation of the memory management unit 110b determining the calculated unit processing number is more than the configured upper limit unit processing number (e.g. when the aforementioned ninth write command is executed), the memory management unit 110b writes a portion of the writing data temporarily stored in the cache memory 120 into the storage area 320. More specifically, the memory management unit 110b writes the portion of the writing data into the mapped physical units (as illustrated in FIG. 3A~FIG. 3C) according to the logical units in which the portion of the writing data is stored. In an identical fashion as the above-described first exemplary embodiment, the memory management unit 110b writes the writing data which belong to the same logical unit in the cache memory 120 into the mapped physical units.

Figure 6:
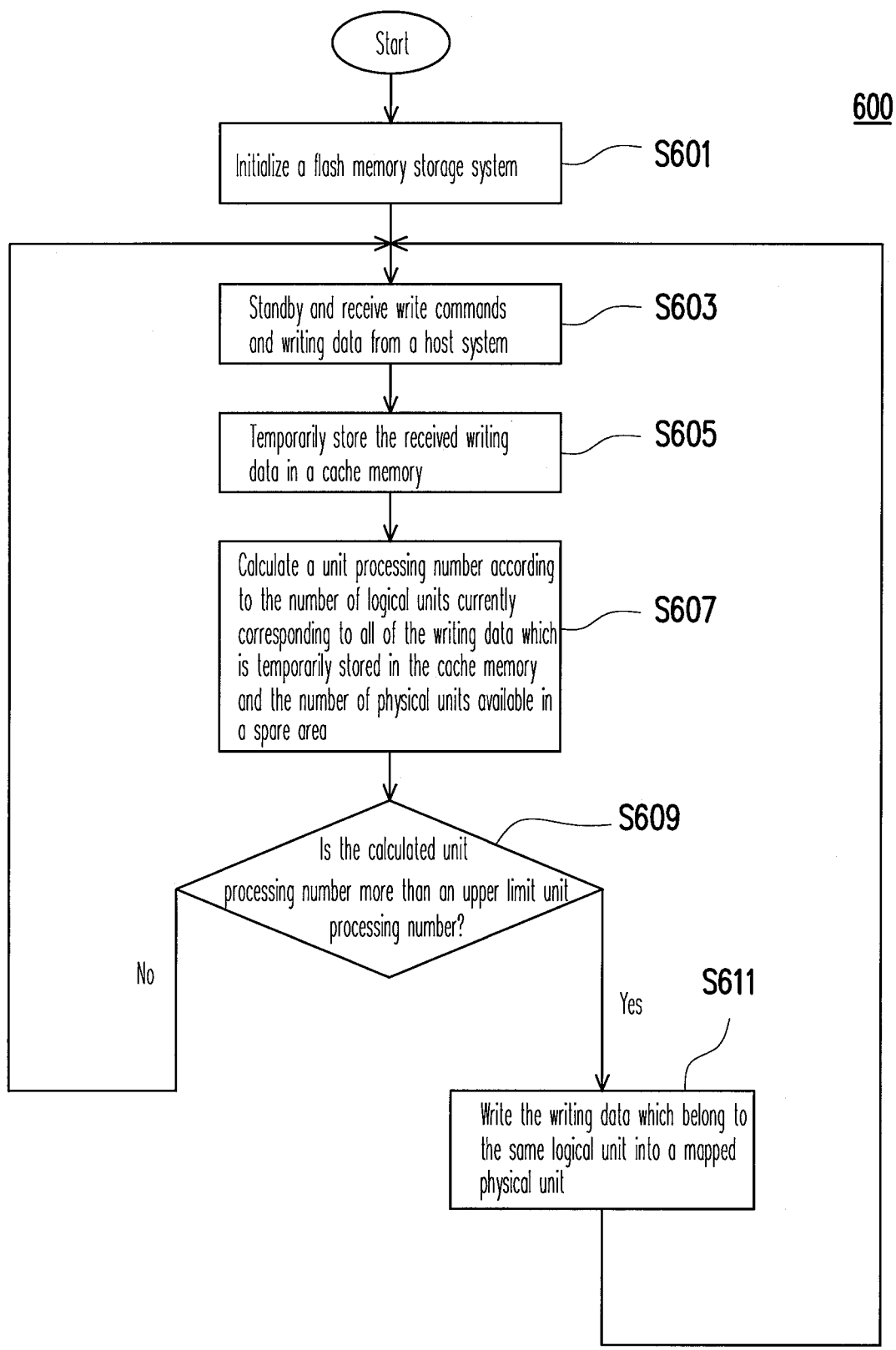
FIG. 6 is a flow chart illustrating a data management process according to a third exemplary embodiment of the present invention.

FIG. 6 is a flow chart illustrating a data management process 600 according to a third exemplary embodiment of the present invention.

Referring to FIG. 6, when the flash memory storage system 100 is activated, in step S601, the flash memory storage system 100 is initialized.

In step S603, the memory management unit 110b of the flash memory controller 110 is on a standby mode to receive the write command and the writing data from the host 200. Then, in step S605, the flash memory controller 110 temporarily stores the writing data into the cache memory 120. Moreover, in step S607, the memory management unit 110b calculates the unit processing number according to the number of the logical units corresponding to the writing data temporarily stored in the cache memory 120 and the number of the available physical units in the spare area 306. Then, in step S609, the memory management unit 110b determines whether the calculated unit processing number is more than the upper limit unit processing number, wherein if the calculated unit processing number is more than the upper limit unit processing number, then in step S611, the memory management unit 110b writes the writing data which belong to the same logical unit into the mapped physical units. Then, the data management process 600 returns to the step S603 for the suspension.

Fourth Exemplary Embodiment

Figure 7:
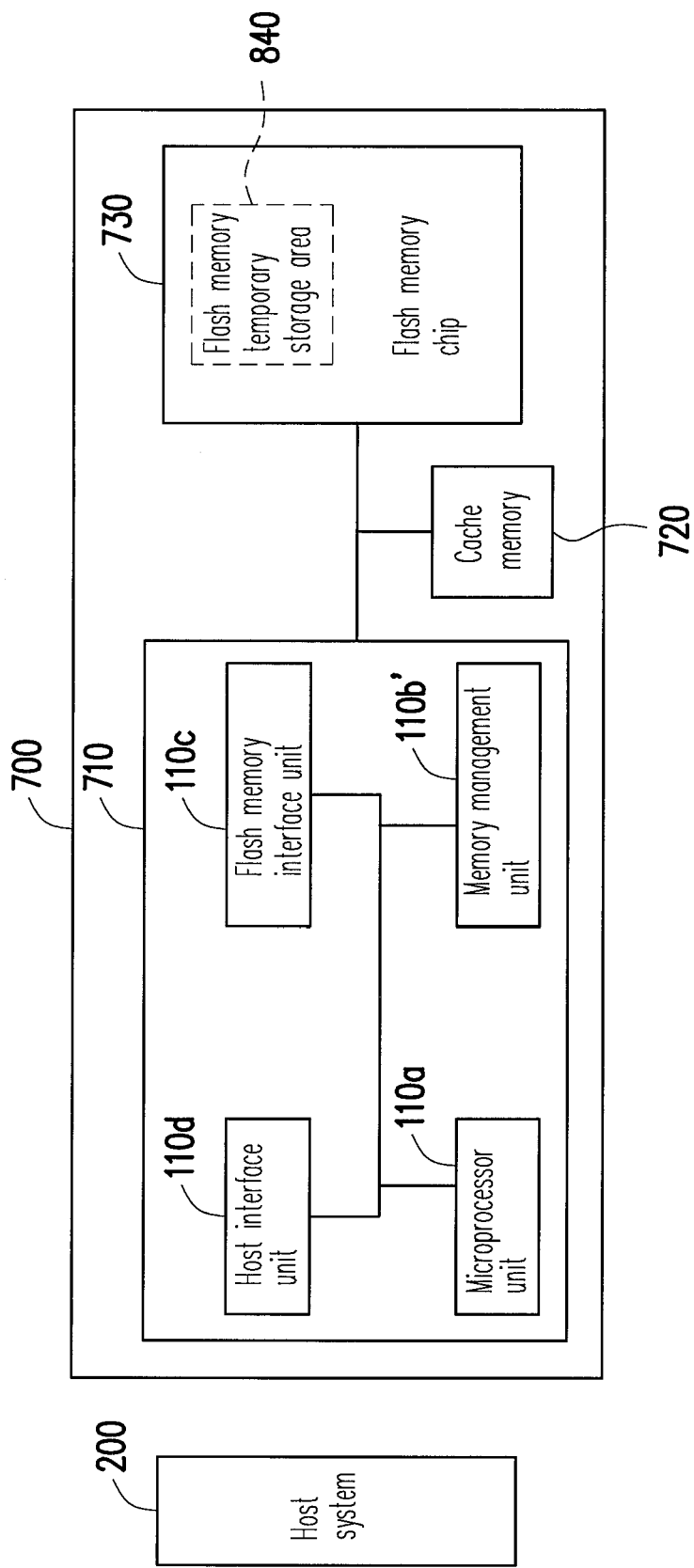
FIG. 7 is a schematic block diagram illustrating a flash memory storage system according to a fourth exemplary embodiment of the present invention.

FIG. 7 is a schematic block diagram illustrating a flash memory storage system 700 according to a fourth exemplary embodiment of the present invention.

Referring to FIG. 7, the flash memory storage system 700 includes a flash memory controller 710, a cache memory 720, and a flash memory chip 730.

The flash memory controller 710 includes a microprocessor unit 110a, a memory management unit 110b, a flash memory interface unit 110c, and a host interface unit 110d. The structures and functions of the microprocessor unit 110a, the flash memory interface unit 110c, and the host interface unit 110d have been described as above, so they will not be repeated here.

The memory management unit 110b' is coupled to the microprocessor unit 110a and is configured to perform block management mechanism, data management, and writing mechanisms according to the present exemplary embodiment.

The cache memory 720 is coupled to the flash memory controller 710 and is configured to temporarily store data accessed by the host 200. In the present exemplary embodiment, the cache memory 720 is a DRAM. However, it is to be understood that the present invention is not limited thereto, MRAM, PRAM, SLC NAND flash memory or other suitable types of memory may also be applied to the present invention.

The flash memory chip 730 is coupled with the flash memory controller 710 for storing data. In the present exemplary embodiment, the flash memory chip 730 is a MLC NAND flash memory. Nevertheless, it should be understood that the present invention is not limited thereto. In another exemplary embodiment, the SLC NAND flash memory may also be applied to the present invention.

Figure 8:
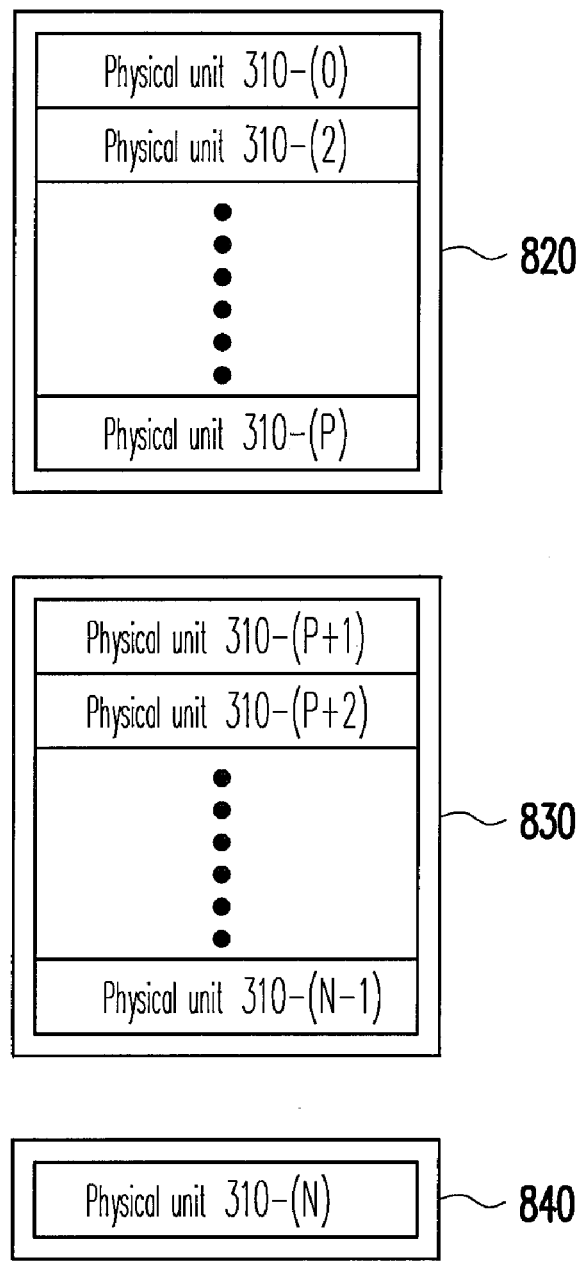
FIG. 8 is a schematic block diagram illustrating a flash memory chip according to an exemplary embodiment of the present invention.

A structure of the flash memory chip 730 is the same as the structure illustrated in FIG. 2, so it will not be repeated here. It is worth mentioning that the physical units 310-(0)~310-(N) are grouped into a storage area 820, a replacement area 830, and a flash memory temporary storage area 840 (as illustrated in FIG. 8), wherein the storage area 820 includes the physical units 310-(P+1)-310-(N−1), and the flash memory temporary storage area 840 includes the physical units 310-(N).

Operations of the physical units in the storage area 820 are the same as illustrated in FIG. 3B~FIG. 3C, and operations of the replacement area 830 are the same as the operations of the replacement area 330, so they will not be repeated here.

The physical units in the flash memory temporary storage area 840 is configured to temporarily store the data which is to be written into the storage area 820. More specifically, when the memory management unit 110b' of the flash memory controller 710 writes the data into the storage area 820, the procedures of the opening and closing the mother-child units are required to be executed (as illustrated in FIG. 3B~FIG. 3C). In particular, when the writing data is non-continuous small data, the memory management unit 110b' executes procedures of the opening and closing the mother-child units repeatedly, thereby performance of the system is reduced. In order to avoid repeatedly executing the procedures of opening and closing mother-child units, in the present exemplary embodiment, the flash memory temporary storage area 840 is configured to store the non-continuous small data. Here, when the writing data from the host 200 is about to be written into 4 sectors which are continuous, the memory management unit 110b' identify the writing data as a continuous large data; otherwise, the writing data is identified as the non-continuous small data. Accordingly, in one exemplary embodiment of the present invention, when the memory management unit 110b' writes the data into the storage area 820, the memory management unit 110b' determines whether the writing data is the continuous large data, wherein when the writing data is the continuous large data, the memory management unit 110b' writes the writing data into the storage area 820; otherwise, the data is temporarily stored in the flash memory temporary storage area 840.

It should be understood that, in the present exemplary embodiment, the flash memory temporary storage area 840 is implemented by one of the physical units in the flash memory chip 730; however, the present invention is not limited thereto, and in another exemplary embodiment of the present invention, a flash memory temporary storage area may be implemented by a plurality of the physical units. In addition, in another exemplary embodiment of the present invention, the flash memory temporary storage area 840 may also be implemented by another flash memory chip.

In the present exemplary embodiment, when the host 200 is about to write the data into the flash memory storage system 700, the memory management unit 110b' receives the write command and the writing data, wherein the write command may include the logical address into which the writing data to be stored. Thereafter, the memory management unit 110b' transforms the logical address into the corresponding logical unit, temporarily stores the writing data in the cache memory 720, and records the logical unit in which the writing data is stored. That is, the cache memory 720 continuously and temporarily stores the writing data from the host 200. Then, when the host 200 issues a flush command or at an appropriate timing, the memory management unit 110b' writes the writing data temporarily stored in the cache memory 720 into the storage area 820 of the flash memory chip 730 or the flash memory temporary storage area 840.

Moreover, after the host 200 issues the write command and the writing data to be stored is temporarily stored in the cache memory 720, the memory management unit 110b' calculates the unit processing number according to the number of the logical units corresponding to the writing data temporarily stored in the cache memory 720 and the number of the available physical units in the spare area of the storage area 820, and compares the calculated unit processing number and the upper limit unit processing number in order to further determine whether the time required for writing the writing data temporarily stored in the cache memory 720 is more than the above-described upper limit processing time.

In the present exemplary embodiment, the setting of the upper limit unit processing number and the comparison of the unit processing number and the upper limit unit processing number is the same as the third exemplary embodiment, so they will not be repeated here. For example, in the present exemplary embodiment, the procedure of closing the mother-child units is required to take 200 milliseconds, and the upper limit processing time is 800 milliseconds, therefore the upper limit unit processing number is set as 4. Compared with the third exemplary embodiment, the present exemplary embodiment further considers the number of the available physical units in the flash memory temporary storage area 840. Operations of the present exemplary embodiment will be described in details in the following by the example of writing data.

Suppose the number of the physical units of the storage area 820 available for opening the mother-child units is 5, there is 1 available physical unit in the flash memory temporary storage area 840, and the memory management unit 110b' has used 3 of the physical units thereof to execute the procedure of opening the mother-child units in order to write the data into the logical units 0, 1, and 2 (i.e., there are 2 available physical units in the spare area 306), if the host issues 10 write commands, wherein the write commands respectively direct writing the data into the logical units 3, 4, 0, 5, 3, 6, 7, 8, 9, and 10, the memory management unit 110b' temporarily stores the writing data in the cache memory 720 and determines whether the time required for writing the writing data temporarily stored in the cache memory 720 is more than the above-described upper limit processing time. A way of such a determination is described as the following.

In a situation of executing the first write command, the writing data corresponding to the logical unit 3 is stored in the cache memory 720. At this time, if the host 200 issues the flush command, the writing data corresponding to the logical unit 3 is required to be written by executing one procedure of opening the mother-child units. Since there are 2 available physical units in the storage area 820 and there is 1 available physical unit in the flash memory temporary storage area 840, in a situation of the unit processing number is 0 and not more than the upper limit unit processing number, the memory management unit 110b' determines that the time required for writing the writing data currently stored in the cache memory 720 does not exceed the above-described upper limit processing time.

In a situation of executing the second write command, the writing data corresponding to the logical units 3 and 4 are stored in the cache memory 720. At this time, if the host 200 issues the flush command, the writing data corresponding to the logical units 3 and 4 are required to be written by executing 2 procedures of opening the mother-child units. Since there are 2 available physical units in the storage area 820 and there is 1 available physical unit in the flash memory temporary storage area 840, in a situation of the unit processing number is 0 and not more than the upper limit unit processing number, the memory management unit 110b' determines that the time required for writing the writing data currently stored in the cache memory 720 does not exceed the above-described upper limit processing time.

In a situation of executing the third write command, the writing data corresponding to the logical units 3, 4, and 0 are stored in the cache memory 720. At this time, if the host 200 issues the flush command, since the procedure of opening the mother-child units corresponding to the logical unit 0 has been executed, the writing data corresponding the logical units 3, 4, and 0 are required to be written by executing 2 procedures of opening the mother-child units. Since there are 2 available physical units in the storage area 820 and there is 1 available physical unit in the flash memory temporary storage area 840, in a situation of the unit processing number is 0 and not more than the upper limit unit processing number, the memory management unit 110b' determines that the time required for writing the writing data currently stored in the cache memory 720 does not exceed the above-described upper limit processing time.

In a situation of executing the fourth write command, the writing data corresponding to the logical units 3, 4, 0, and 5 are stored in the cache memory 720. At this time, if the host 200 issues the flush command, since the procedure of opening the mother-child units corresponding to the logical unit 0 has been executed, the writing data corresponding to the logical units 3, 4, 0, and 5 are required to be written by executing 3 procedures of opening the mother-child units. Since there are 2 available physical units in the storage area 820 and there is 1 available physical unit in the flash memory temporary storage area 840, in a situation of the unit processing number is 0 (i.e., 3 minus by 3) and not more than the upper limit unit processing number, the memory management unit 110b' determines that the time required for writing the writing data currently stored in the cache memory 720 does not exceed the above-described upper limit processing time.

In a situation of executing the fifth write command, the writing data corresponding to the logical units 3, 4, 0, and 5 are stored in the cache memory 720. At this time, if the host 200 issues the flush command, since the procedure of opening the mother-child units corresponding to the logical unit 0 has been executed, the writing data of the corresponding logical unit 3, 4, 0, and 5 are required to be written by executing 3 procedures of opening the mother-child units. Since there are 2 available physical units in the storage area 820 and there is 1 available physical unit in the flash memory temporary storage area 840, in a situation of the unit processing number is 0 (i.e., 3 minus by 3) and not more than the upper limit unit processing number, the memory management unit 110b' determines that the time required for writing the writing data currently stored in the cache memory 720 does not exceed the above-described upper limit processing time.

In a situation of executing the sixth write command, the writing data corresponding to the logical units 3, 4, 0, 5, and 6 are stored in the cache memory 720. At this time, if the host 200 issues the flush command, since the procedure of opening the mother-child units corresponding to the logical unit 0 has been executed, the writing data corresponding to the logical units 3, 4, 0, 5, and 6 are required to be written by executing 4 procedures of opening the mother-child units. Since there are 2 available physical units in the storage area 820 and there is 1 available physical unit in the flash memory temporary storage area 840, in a situation of the unit processing number is 1 (i.e., 4 minus by 3) and not more than the upper limit unit processing number, the memory management unit 110b' determines that the time required for writing the writing data currently stored in the cache memory 720 does not exceed the above-described upper limit processing time.

In a situation of executing the seventh write command, the writing data corresponding to the logical units 3, 4, 0, 5, 6, and 7 are stored in the cache memory 720. At this time, if the host 200 issues the flush command, since the procedure of opening the mother-child units corresponding to the logical unit 0 has been executed, the writing data corresponding to the logical units 3, 4, 0, 5, 6, and 7 are required to be written by executing 5 procedures of opening the mother-child units. Since there are 2 available physical units in the storage area 820 and there is 1 available physical unit in the flash memory temporary storage area 840, in a situation of the unit processing number is 2 (i.e., 5 minus by 3) and not more than the upper limit unit processing number, the memory management unit 110b' determines that the time required for writing the writing data currently stored in the cache memory 720 does not exceed the above-described upper limit processing time.

In a situation of executing the eighth write command, the writing data corresponding to the logical units 3, 4, 0, 5, 6, 7, and 8 are stored in the cache memory 720. At this time, if the host 200 issues the flush command, since the procedure of opening the mother-child units corresponding to the logical unit 0 has been executed, the writing data corresponding to the logical units 3, 4, 0, 5, 6, 7, and 8 are required to be written by executing 6 procedures of opening the mother-child units. Since there are 2 available physical units in the storage area 820 and there is 1 available physical unit in the flash memory temporary storage area 840, in a situation of the unit processing number is 3 (i.e., 6 minus by 3) and not more than the upper limit unit processing number, the memory management unit 110b' determines that the time required for writing the writing data currently stored in the cache memory 720 does not exceed the above-described upper limit processing time.

In a situation of executing the ninth write command, the writing data corresponding to the logical units 3, 4, 0, 5, 6, 7, 8, and 9 are stored in the cache memory 720. At this time, if the host 200 issues the flush command, since the procedure of opening the mother-child units corresponding to the logical unit 0 has been executed, the writing data corresponding to the logical units 3, 4, 0, 5, 6, 7, 8, and 9 are required to be written by executing 7 procedures of opening the mother-child units. Since there are 2 available physical units in the storage area 820 and there is 1 available physical unit in the flash memory temporary storage area 840, in a situation of the unit processing number is 4 (i.e., 7 minus by 3) and not more than the upper limit unit processing number, the memory management unit 110b' determines that the time required for writing the writing data currently stored in the cache memory 720 does not exceed the above-described upper limit processing time.

In a situation of executing the tenth write command, the writing data corresponding to the logical units 3, 4, 0, 5, 6, 7, 8, 9, and 10 are stored in the cache memory 720. At this time, if the host 200 issues the flush command, since the procedure of opening the mother-child units corresponding to the logical unit 0 has been executed, the writing data corresponding the logical units 3, 4, 0, 5, 6, 7, 8, 9, and 10 are required to be written by executing 8 procedures of opening the mother-child units. Since there are 2 available physical units in the storage area 820 and there is 1 available physical unit in the flash memory temporary storage area 840, in a situation of the unit processing number is 5 (i.e., 8 minus by 3) and more than the upper limit unit processing number, the memory management unit 110b' determines that the time required for writing the writing data currently stored in the cache memory 720 exceeds the above-described upper limit processing time.

In the present exemplary embodiment, in a situation of the memory management unit 110b' determining the calculated unit processing number is more than the upper limit unit processing number, the memory management unit 110b' writes a portion of the writing data temporarily stored in the cache memory 720 into the flash memory temporary storage area 840 or the storage area 820.

Figure 9:
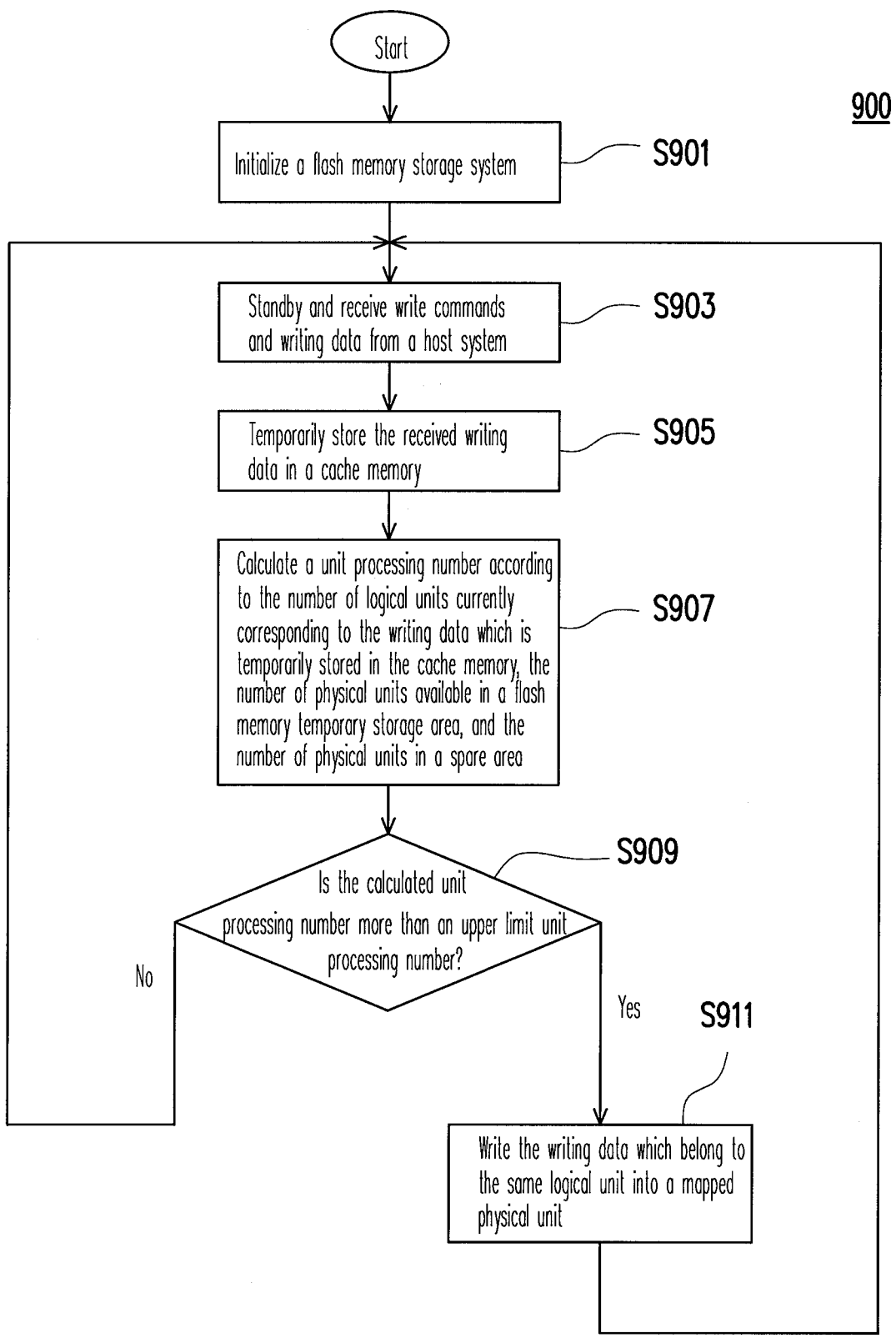
FIG. 9 is a flow chart illustrating a data management process according to a fourth exemplary embodiment of the present invention.

FIG. 9 is a flow chart illustrating a data management process 900 according to a fourth exemplary embodiment of the present invention.

Referring to FIG. 9, when the flash memory storage system 700 is activated, in step S901, the flash memory storage system 700 is initialized.

In step S903, the memory management unit 110b' of the flash memory controller 710 is on a standby mode to receive the write command and the writing data from the host 200. Then, in step S905, the memory management unit 110b' temporarily stores the writing data into the cache memory 720. Moreover, in step S907, the memory management unit 110b' calculates the unit processing number according to the number of the logical units corresponding to the writing data temporarily stored in the cache memory 720, the number of the available physical units in the flash memory temporary storage area 840, and the number of the available physical units in the spare area of the storage area 820. Then, in step S909, the memory management unit 110b' determines whether the calculated unit processing number is more than the upper limit unit processing number, wherein if the calculated unit processing number is more than the upper limit unit processing number, then in step S911, the memory management unit 110b' writes the writing data which belong to the same logical unit into the mapped physical units. Then, the data management process 900 returns to the step S903 for the standby mode.

It should be understood that, even the above-described exemplary embodiment just describes processes of the flash memory storage system executing the write commands, however it is to be noted that, the flash memory controller may also execute reading, erasing, deactivation or other commands according to the related information of the flash memory chip when the flash memory controller is on the standby mode, wherein the operations of the commands are well-known to the one having ordinary skills in the art, so they will not be described here. In addition, it should be understood that, the present invention are not limited to execution orders illustrated in FIG. 4, FIG. 5, FIG. 6, and FIG. 9, and the one having ordinary skills in the art may execute the aforementioned procedures in different execution orders from those illustrated in FIG. 4, FIG. 5, FIG. 6, and FIG. 9 based on spirits of the present invention.

In summary, the present invention processes the writing data in the cache memory in advance by determining whether the flash memory controller is able to write all the writing data temporarily stored in the cache memory into the flash memory chip within the upper limit processing time, so as to avoid a delay problem which may be caused by the host issuing the flush command.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data management method, for a flash memory storage system, wherein the flash memory storage system comprises a cache memory and a flash memory, and the flash memory comprises a plurality of physical blocks, the data management method comprising:

temporarily storing a plurality of writing data from a host in the cache memory;

determining whether a time for writing the writing data temporarily stored in the cache memory into the flash memory is more than a upper limit processing time; and writing at least a portion of the writing data temporarily stored in the cache memory into the flash memory when the time for writing the writing data temporarily stored in the cache memory into the flash memory is more than the upper limit processing time.

2. The data management method as claimed in claim 1, further comprising:

grouping at least a portion of the physical blocks into a plurality of physical units; and allocating a plurality of logical units, wherein each of the logical units maps to at least one physical unit, and each of the writing data is written to one of the logical units.

3. The data management method as claimed in claim 2, wherein the step of determining whether the time for writing the writing data temporarily stored in the cache memory into the flash memory is more than the upper limit processing time comprises:

determining whether the number of the logical units in which the writing data is written is more than a data dispersity threshold, wherein the time for writing the writing data temporarily stored in the cache memory into the flash memory is determined more than the upper limit processing time when the number of the logical units in which the writing data is written is more than the data dispersity threshold.

4. The data management method as claimed in claim 2, further comprises grouping the physical units into at least a data area and a spare area.

5. The data management method as claimed in claim 4, wherein the step of determining whether the time for writing the writing data into the flash memory is more than the upper limit processing time comprising:

getting a unit processing number according to the number of the logical units in which the writing data is written and the number of the physical units available in the spare area; and determining whether the unit processing number is more than an upper limit unit processing number, wherein the time for writing the writing data temporarily stored in the cache memory into the flash memory is determined more than the upper limit processing time when the unit processing number is more than the upper limit unit processing number.

6. The data management method as claimed in claim 4, wherein the step of writing at least the portion of the writing data temporarily stored in the cache memory into the flash memory comprising:

selecting at least one logical unit from the logical units into which the writing data is written;

selecting at least one physical unit from the physical units of the spare area; and writing the writing data of the at least one logical unit in the cache memory and writing valid data in the physical units mapped to the at least one logical unit into the at least one physical unit from the physical units of the spare area.

7. The data management method as claimed in claim 6, wherein the step of writing at least the portion of the writing data temporarily stored in the cache memory into the flash memory comprising:

determining whether a ratio of data quantity of the writing data written into the at least one logical unit in the cache memory to a capacity of the at least one logical unit is more than a ratio threshold; and copying the valid data of the physical units mapped to the at least one logical unit into the cache memory and integrating the valid data with the writing data of the at least one logical unit when the ratio of data quantity of the writing data written into the at least one logical unit in the cache memory to the capacity of the at least one logical unit is more than the ratio threshold.

8. The data management method as claimed in claim 1, wherein the step of determining whether the time for writing the writing data temporarily stored in the cache memory into the flash memory is more than the upper limit processing time comprises:

determining whether a data quantity of the writing data temporarily stored in the cache memory is more than a data quantity threshold, wherein the time for writing the writing data temporarily stored in the cache memory into the flash memory is determined more than the upper limit processing time when the data quantity of the writing data temporarily stored in the cache memory is more than the data quantity threshold.

9. The data management method as claimed in claim 1, further comprising:

allocating a flash memory temporary storage area in the flash memory storage system; and writing at least a portion of the writing data temporarily stored in the cache memory into the flash memory temporary storage area when the time for writing the writing data temporarily stored in the cache memory into the flash memory is more than the upper limit processing time.

10. A flash memory controller, is adapted to a flash memory storage system, wherein the flash memory storage system comprises a cache memory and a flash memory, and the flash memory comprises a plurality of physical blocks, the flash memory controller comprising:

a microprocessor unit;

a host interface unit, coupled to the microprocessor unit, is used to connect to a host;

a flash memory interface unit, coupled to the microprocessor unit, is configured to connect to the flash memory; and a memory management unit, coupled to the microprocessor unit, wherein the memory management unit temporarily is configured to store a plurality of writing data from a host in the cache memory, wherein the memory management unit is further configured to determine whether a time for writing the writing data temporarily stored in the cache memory into the flash memory is more than a upper limit processing time, wherein the memory management unit is further configured to write at least a portion of the writing data temporarily stored in the cache memory into the flash memory when the time for writing the writing data stored in the cache memory into the flash memory is more than the upper limit processing time.

11. The flash memory controller as claimed in claim 10, wherein the memory management unit is further configured to group at least a portion of the physical blocks into a plurality of physical units and allocates a plurality of logical units, wherein each of the logical units maps to the at least one physical unit, wherein each of the writing data is written to one of the logical units.

12. The flash memory controller as claimed in claim 11, wherein the memory management unit is further configured to determine whether the number of the logical units in which the writing data is written is more than a data dispersity threshold, wherein the memory management unit determines the time for writing the writing data temporarily stored in the cache memory into the flash memory is more than the upper limit processing time when the number of the logical units in which the writing data is written is more than the data dispersity threshold.

13. The flash memory controller as claimed in claim 11, wherein the memory management unit is further configured to group the physical units into at least a data area and a spare area.

14. The flash memory controller as claimed in claim 13, wherein the memory management unit is further configured to get a unit processing number according to the number of the logical units in which the writing data is written and the number of the physical units available in the spare area and determines whether the unit processing number is more than a upper limit unit processing number, wherein the memory management unit determines the time for writing the writing data temporarily stored in the cache memory into the flash memory is more than the upper limit processing time when the unit processing number is more than the upper limit unit processing number.

15. The flash memory controller as claimed in claim 13, wherein the memory management unit is further configured to select at least one logical unit from the logical units into which the writing data is written, select at least one physical unit from the physical units of the spare area, and write the writing data which is written into the at least one logical unit in the cache memory and valid data in the physical units mapped to the at least one logical unit into the at least one physical unit from the physical units of the spare area.

16. The flash memory controller as claimed in claim 15, wherein the memory management unit is further configured to determine whether a ratio of data quantity of the writing data written into the at least one logical unit in the cache memory to a capacity of the at least one logical unit is more than a ratio threshold, wherein the memory management unit is further configured to copy the valid data of the physical units mapped to the at least one logical unit into the cache memory and integrate the valid data with the writing data of the at least one logical unit when the ratio of data quantity of the writing data written into the at least one logical unit in the cache memory to the capacity of the at least one logical unit is more than the ratio threshold.

17. The flash memory controller as claimed in claim 10, wherein the memory management unit is further configured to determine whether data quantity of the writing data temporarily stored in the cache memory is more than a data quantity threshold, wherein the memory management unit determines the time for writing the writing data temporarily stored in the cache memory into the flash memory is more than the upper limit processing time when the data quantity of the writing data temporarily stored in the cache memory is more than the data quantity threshold.

18. The flash memory controller as claimed in claim 10, wherein the flash memory storage system further comprises a flash memory temporary storage area, wherein the memory management unit is further configured to write at least a portion of the writing data temporarily stored in the cache memory into the flash memory temporary storage area when the time for writing the writing data temporarily stored in the cache memory into the flash memory is more than the upper limit processing time.

19. A flash memory storage system, comprising:

a cache memory;

a flash memory, comprising a plurality of physical blocks; and a flash memory controller, coupled to the cache memory and the flash memory, wherein the flash memory controller temporarily is configured to store a plurality of writing data from a host in the cache memory, wherein the flash memory controller is further configured to determine whether a time for writing the writing data temporarily stored in the cache memory into the flash memory is more than a upper limit processing time, wherein the flash memory controller is further configured to write at least a portion of the writing data temporarily stored in the cache memory into the flash memory when the time for writing the writing data temporarily stored in the cache memory into the flash memory is more than the upper limit processing time.

20. The flash memory storage system as claimed in claim 19, wherein the flash memory controller is further configured to group at least a portion of the physical blocks into a plurality of physical units and allocates a plurality of logical units, wherein each of the logical units maps to at least one physical unit, wherein each of the writing data is written to one of the logical units.

21. The flash memory storage system as claimed in claim 20, wherein the flash memory controller is further configured to determine whether the number of the logical units in which the writing data is written is more than a data dispersity threshold,
wherein the flash memory controller determines the time for writing the writing data into the flash memory is more than the upper limit processing time when the number of the logical units in which the writing data is written is more than the data dispersity threshold.

22. The flash memory storage system as claimed in claim 20, wherein the flash memory controller is further configured to group the physical units into at least a data area and a spare area.

23. The flash memory storage system as claimed in claim 22, wherein the flash memory controller is further configured to get a unit processing number according to the number of the logical units in which the writing data is written and the number of the physical units available in the spare area and determines whether the unit processing number is more than a upper limit unit processing number,
wherein the flash memory controller determines the time for writing the writing data into the flash memory is more than the upper limit processing time when the unit processing number is more than the upper limit unit processing number.

24. The flash memory storage system as claimed in claim 22, wherein the flash memory controller is further configured to select at least one logical unit from the logical units into which the writing data is written, select at least one physical unit from the physical units of the spare area, and write the writing data written into the at least one logical unit in the cache memory and valid data in the physical units mapped to the at least one logical unit into the at least one physical unit from the physical units of the spare area.

25. The flash memory storage system as claimed in claim 24, wherein the flash memory controller is further configured to determine whether a ratio of data quantity of the writing data written into the at least one logical unit in the cache memory to a capacity of the at least one logical unit is more than a ratio threshold,
wherein the flash memory controller copies the valid data of the physical units mapped to the at least one logical unit into the cache memory and integrates the valid data with the writing data of the at least one logical unit when the ratio of the data quantity of the writing data written into the at least one logical unit in the cache memory to the capacity of the at least one logical unit is more than the ratio threshold.

26. The flash memory storage system as claimed in claim 19, wherein the flash memory controller is further configured to determine whether data quantity of the writing data temporarily stored in the cache memory is more than a data quantity threshold, wherein the flash memory controller determines the time for writing the writing data temporarily stored in the cache memory into the flash memory is more than the upper limit processing time when the data quantity of the writing data temporarily stored in the cache memory is more than the data quantity threshold.

27. The flash memory storage system as claimed in claim 19, further comprises a flash memory temporary storage area,
wherein the flash memory controller writes at least a portion of the writing data temporarily stored in the cache memory into the flash memory temporary storage area when the time for writing the writing data temporarily stored in the cache memory into the flash memory is more than the upper limit processing time.

\* \* \* \* \*